United States Patent
Sugishita et al.

(10) Patent No.: US 7,538,901 B2
(45) Date of Patent: May 26, 2009

(54) MULTIFUNCTION PERIPHERAL WITH EFFICIENT USE OF MEMORY RESOURCES

(75) Inventors: Satoru Sugishita, Kanagawa (JP);
Katsuhiko Sasaki, Kanagawa (JP);
Ryohichi Katoh, Kanagawa (JP);
Yoshihiko Abe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 974 days.

(21) Appl. No.: 10/646,819

(22) Filed: Aug. 25, 2003

(65) Prior Publication Data
US 2004/0095602 A1 May 20, 2004

(30) Foreign Application Priority Data

| Aug. 27, 2002 | (JP) | 2002-247448 |
| Aug. 28, 2002 | (JP) | 2002-249629 |
| Sep. 2, 2002 | (JP) | 2002-256761 |
| Aug. 11, 2003 | (JP) | 2003-291045 |

(51) Int. Cl.
*G06F 15/00* (2006.01)
*G06K 1/00* (2006.01)

(52) U.S. Cl. ............. 358/1.16; 358/1.15; 358/1.17; 358/1.18; 358/1.13

(58) Field of Classification Search ............. 358/1.13, 358/1.15, 1.16, 1.14; 710/56; 400/76; 709/220, 709/218; 717/151, 168; 715/210
See application file for complete search history.

(56) References Cited

U.S. PATENT DOCUMENTS

| 5,659,670 | A | * | 8/1997 | AuClair | 358/1.16 |
| 5,689,730 | A | * | 11/1997 | Wakasugi | 710/56 |
| 6,044,384 | A | * | 3/2000 | Ishima et al. | 715/210 |
| 6,078,745 | A | * | 6/2000 | De Greef et al. | 717/151 |
| 6,226,095 | B1 | * | 5/2001 | Fukuta | 358/1.13 |
| 6,491,453 | B1 | * | 12/2002 | Fukano et al. | 400/76 |
| 6,567,179 | B1 | * | 5/2003 | Sato et al. | 358/1.15 |
| 6,977,748 | B2 | * | 12/2005 | Kawai | 358/1.16 |
| 6,999,188 | B1 | * | 2/2006 | Ashe | 358/1.15 |

(Continued)

FOREIGN PATENT DOCUMENTS

JP 7-288561 10/1995

(Continued)

OTHER PUBLICATIONS

U.S. Appl. No. 10/251,833, filed Sep. 23, 2002, Sugishita.

(Continued)

*Primary Examiner*—Edward L Coles
*Assistant Examiner*—Satwant K Singh
(74) *Attorney, Agent, or Firm*—Oblon, Spivak, McClelland, Maier & Neustadt, P.C.

(57) ABSTRACT

An apparatus for forming an image, in which hardware resources for use in the forming of images are provided, and one or more processes run based on programs in respect of the forming of images. The apparatus includes an off-line unit which puts the one or more processes in a off-line state in which restriction is placed on the running of the one or more processes, a memory area releasing unit which releases one or more memory areas used by the one or more processes that are put in the off-line state, and a data laying-out unit which lays out data in the one or more memory areas released by the memory area releasing unit.

30 Claims, 39 Drawing Sheets

U.S. PATENT DOCUMENTS

| | | | |
|---|---|---|---|
| 7,007,077 B1 * | 2/2006 | Shinohara et al. | 709/220 |
| 7,177,034 B2 * | 2/2007 | Nakagawa et al. | 358/1.14 |
| 7,209,249 B2 | 4/2007 | Morita | |
| 7,212,306 B2 * | 5/2007 | Chrisop et al. | 358/1.16 |
| 7,271,924 B1 | 9/2007 | Takamizawa et al. | |
| 7,336,387 B2 * | 2/2008 | Nakami et al. | 358/1.16 |
| 2003/0112461 A1 * | 6/2003 | Ogura | 358/1.15 |
| 2004/0030758 A1 * | 2/2004 | Cherdron et al. | 709/218 |
| 2004/0095602 A1 | 5/2004 | Sugishita et al. | |
| 2005/0102660 A1 * | 5/2005 | Chen et al. | 717/168 |
| 2006/0158675 A1 | 7/2006 | Morita | |
| 2006/0164670 A1 | 7/2006 | Morita | |
| 2007/0296999 A1 | 12/2007 | Takamizawa et al. | |

FOREIGN PATENT DOCUMENTS

| | | |
|---|---|---|
| JP | 9-167094 | 6/1997 |
| JP | 2000-330777 | 11/2000 |
| JP | 2001-180052 | 7/2001 |
| JP | 2002-84383 | 3/2002 |

OTHER PUBLICATIONS

U.S. Appl. No. 11/137,759, filed May 26, 2005, Sugishita et al.
U.S. Appl. No. 11/500,955, filed Aug. 9, 2006, Sugishita.
U.S. Appl. No. 11/828,051, filed Jul. 25, 2007, Sugishita.

* cited by examiner

FIG.7

| COPIER APPLICATION | FACSIMILE APPLICATION | PRINTER APPLICATION | SCANNER APPLICATION | NETWORK FILE APPLICATION | SCS | NCS |
|---|---|---|---|---|---|---|
| · SCAN<br>· PRINT<br>· LS ACCUMULATION | · LS ACCUMULATION<br>· TRANSMISSION AND RECEPTION<br>· PRINTING OF RECEIVED DOCUMENT | · PRINT<br>· LS ACCUMULATION | · SCAN<br>· LS ACCUMULATION | · PRINT<br>· LS ACCUMULATION | · MASKING OF OPERATION-PANEL EVENT<br>· REQUEST FOR JOB EXECUTION | · COMMUNICATION EVENT |

FIG.31

| APPLICATION NAME | APPLICATION A | APPLICATION B | ... | APPLICATION N |
|---|---|---|---|---|
| FIXED AREA START ADDRESS | 0x100000 | 0x250000 | | 0x650000 |
| FIXED AREA END ADDRESS | 0x1FFFFF | 0x3FFFFF | | 0x7FFFFF |
| VARYING AREA START ADDRESS | 0x200000 | 0x400000 | | 0x800000 |
| VARYING AREA END ADDRESS | 0x24FFFF | 0x47FFFF | | 0x80FFFF |

FIG.38

| ORDER OF TERMINATION | DEFAULT | MEMORY SIZE | SHARED MEMORY |
|---|---|---|---|
| 1 | NET-FILE | COPY | COPY |
| 2 | SCANNER | FAX | PRINTER |
| 3 | FAX | NET-FILE | FAX |
| 4 | COPY | PRINTER | SCANNER |
| 5 | PRINTER | SCANNER | NET-FILE |

MULTIFUNCTION PERIPHERAL WITH EFFICIENT USE OF MEMORY RESOURCES

BACKGROUND OF THE INVENTION

1. Field of the Invention

The present invention generally relates to image forming apparatuses, and particularly relates to an image forming apparatus and a method of allocating memory areas which make efficient use of memory resources.

2. Description of the Related Art

In recent years, an image forming apparatus (multifunction peripheral) that combines a plurality of machine-specific functions such as those of a printer, a copier, a facsimile machine, a scanner, etc., in one device has become widely popular. This multifunction peripheral is provided with a display unit, a print unit, an imaging unit, etc., in one device, and is also provided with four applications corresponding to a printer, a copier, a facsimile machine, and a scanner, respectively. Switching of the applications provides for the multifunction peripheral to perform any desired function of a printer, a copier, a facsimile machine, and a scanner.

Since the multifunction peripheral operates by use of various applications that run based on programs, addition of a new function or the like can easily be made by updating the programs.

As is often employed in personal computers or the like, updating of the programs may be performed through networks such as the Internet. That is, it may be done by connecting to a server where an updating program is stored and by acquiring (downloading) the updating program from the server.

In this case, the updating program downloaded from the server is laid out in memory, and is written into EEPROMs (electrically erasable and programmable ROM) such as a flash memory for program updating.

Since the updating program downloaded from the server is laid out in the memory, there is a need for a memory area in which the updating program is laid out.

This memory area is part of the memory space that is acquired and released for applications or the like to carry out processes. The operating system (OS) is responsible for the management of memory areas that are acquired and released. It follows that applications acquire and release memory areas by use of system calls provided by the OS.

Further, memory devices implemented on a machine is generally limited to a minimum memory size in order to suppress costs.

As a result, the provision of an extra memory in a multifunction peripheral for relatively less frequent processing such as program updating is not a preferred option in consideration of cost factors. Whilst that is the case, an image forming apparatus requires as much memory space as possible in order to process image data which generally has a large data size.

Accordingly, there is a need for an image forming apparatus and a method of acquiring memory areas which make efficient use of memory resources provided in the image forming apparatus.

SUMMARY OF THE INVENTION

It is a general object of the present invention to provide an image forming apparatus and a method of acquiring memory areas that substantially obviate one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by an image forming apparatus and a method-of acquiring memory areas particularly pointed out in the specification in such full, clear, concise, and exact terms as to enable a person having ordinary skill in the art to practice the invention.

To achieve these and other advantages in accordance with the purpose of the invention, the invention provides an apparatus for forming an image, in which hardware resources for use in the forming of images are provided, and one or more processes run based on programs in respect of the forming of images. The apparatus includes an off-line unit which puts the one or more processes in a off-line state in which restriction is placed on the running of the one or more processes, a memory area releasing unit which releases one or more memory areas used by the one or more processes that are put in the off-line state, and a data laying-out unit which lays out data in the one or more memory areas released by the memory area releasing unit.

According to another aspect of the invention, the data laying-out unit prompts the off-line unit to put the one or more processes in the off-line state as preparation for laying out the data in the one or more memory areas.

According to another aspect of the invention, the data laying-out unit prompts the memory area releasing unit to release the one or more memory areas used by the one or more processes that are put in the off-line state, after the off-line unit puts the one or more processes in the off-line state.

According to another aspect of the invention, the off-line unit sends an off-line-shift request to the one or more processes for putting the one or more processes to the off-line state.

According to another aspect of the invention, the off-line unit notifies the data laying-out unit whether the one or more processes are in the off-line state, upon receiving a response from the one or more processes responding to the off-line-shift request.

According to another aspect of the invention, the off-line unit notifies the data laying-out unit that the one or more processes are in the off-line state, after all the one or more processes having received the off-line-shift request shift to the off-line state.

According to another aspect of the invention, the off-line unit notifies the data laying-out unit that the one or more processes did not shift to the off-line state, after a notice indicating inability to shift to the off-line state is received from the one or more processes having received the off-line-shift request.

According to another aspect of the invention, the off-line unit notifies the data laying-out unit that the one or more processes did not shift to the off-line state, after waiting for a response from all of the processes having received the off-line-shift request, even when a notice indicating inability to shift to the off-line state is received from one or more of the processes having received the off-line-shift request.

According to another aspect of the invention, the off-line unit notifies the data laying-out unit that the one or more processes did not shift to the off-line state, after a notice indicating inability to shift to the off-line state is received from one of the one or more processes having received the off-line-shift request, without waiting for a response from others of the one or more processes having received the off-line-shift request.

According to another aspect of the invention, the off-line unit measures a time lapse from the sending of the off-line-shift request to the one or more processes, and notifies the data laying-out unit that the one or more processes are in the off-line state after a predetermined length of the time lapse even if no response to the off-line-shift request is received from the one or more processes.

According to another aspect of the invention, the one or more processes are allowed to run without the restriction after the off-line unit cancels the off-line state.

According to another aspect of the invention, the restriction involves preventing an action by the one or more processes responding to a request from another process.

According to another aspect of the invention, the one or more processes having shifted to the off-line state registers the request from another process.

According to another aspect of the invention, a process terminating unit is further provided that terminates the one or more processes having shifted to the off-line state.

According to another aspect of the invention, the process terminating unit terminates the one or more processes in a predetermined order.

According to another aspect of the invention, the order is defined according to priority assigned to each of the one or more processes.

According to another aspect of the invention, the order is defined according to size of memory areas allocated to the one or more respective processes.

According to another aspect of the invention, the order is defined according to position of memory areas allocated to the one or more respective processes.

According to another aspect of the invention, the memory area releasing unit releases memory areas that are no longer used after the process terminating unit terminates the one or more processes.

According to another aspect of the invention, the memory area releasing unit releases the memory areas according to size of the data that is to be laid out.

According to another aspect of the invention, the memory area releasing unit notifies the data laying-out unit of completion of releasing of the one or more memory areas after releasing the one or more memory areas.

According to another aspect of the invention, the data laid out by the data laying-out unit is an updating program for updating at least one of the programs, and the data laying-out unit obtains the updating program through data communication.

According to another aspect of the invention, a program updating unit is further provided that updates at least one of the programs in response to a program updating start request sent from the data laying-out unit.

According to another aspect of the invention, an input unit is further provided that is used to operate the apparatus, and the program updating unit invalidates the input unit when updating at least one of the programs.

According to another aspect of the invention, the program updating unit reboots the apparatus after completing the updating of at least one of the programs.

According to another aspect of the invention, the program updating unit notifies a device of status of the program updating, the device communicating with the apparatus.

According to another aspect of the invention, the program updating unit notifies of the status of the program updating by use of a process that has shifted to the off-lien state.

According to another aspect of the invention, the one or more memory areas are outside control of an operating system that controls the running of the one or more programs and the hardware resources.

According to another aspect, the invention provides a method of acquiring one or more memory areas in an image forming apparatus, in which hardware resources for use in the forming of images are provided, and one or more processes run based on programs in respect of the forming of images, the running of the programs and the hardware resources being controlled by an operating system. The method includes an off-line step of putting the one or more processes in a off-line state in which restriction is placed on the running of the one or more processes, a memory area releasing step of releasing one or more memory areas used by the one or more processes that are put in the off-line state, and a data laying-out step of laying out data in the one or more memory areas released by the memory area releasing step.

According to another aspect of the invention, the method further includes a process terminating step of terminating the one or more processes having shifted to the off-line state.

According to another aspect of the invention, the data laid out by the data laying-out step is an updating program for updating at least one of the programs.

Other objects and further features of the present invention will be apparent from the following detailed description when read in conjunction with the accompanying drawings.

BRIEF DESCRIPTION OF THE DRAWINGS

FIG. 7 is an illustrative drawing showing restrictions that are placed on processes that are put in the off-line state;

FIG. 31 is a table chart showing memory area information indicative of varying areas and fixed areas;

FIG. 38 is a table chart showing various orders of process termination; and.

DESCRIPTION OF THE PREFERRED EMBODIMENTS

In the following, embodiments of the present invention will be described with reference to the accompanying drawings.

Figure 1:
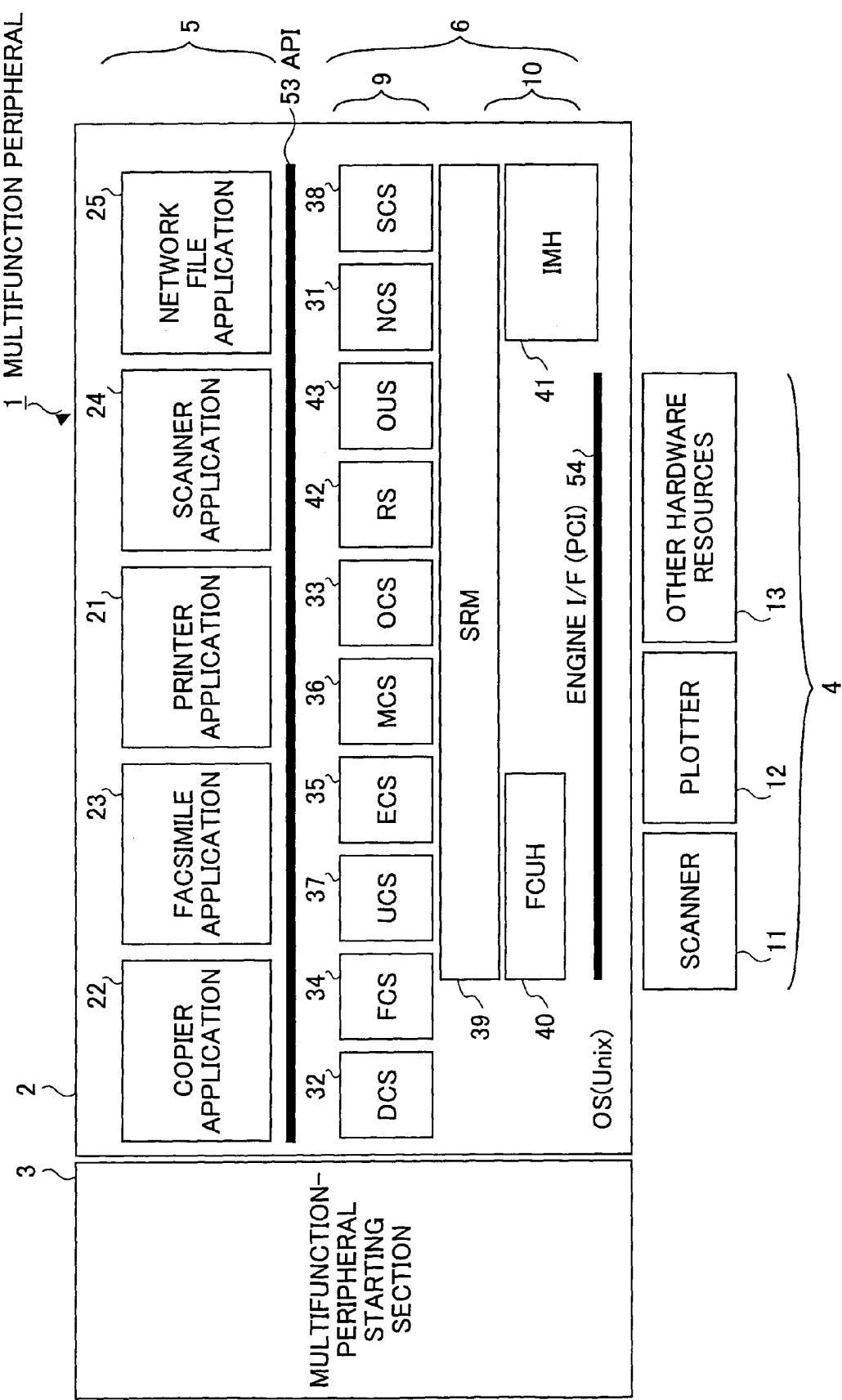
FIG. 1 is a block diagram showing an embodiment of a multifunction peripheral which is an image forming apparatus according to the invention.

FIG. 1 is a block diagram showing an embodiment of a multifunction peripheral which is an image forming apparatus according to the-invention. A multifunction peripheral 1 includes a software set 2, a multifunction-peripheral starting section 3, and hardware resources 4.

The multifunction-peripheral starting section 3 operates first upon the power-on of the multifunction peripheral 1, and starts an application layer 5 and a platform layer 6. For example, the multifunction-peripheral starting section 3 reads programs for the application layer 5 and the platform layer 6 from a hard disk drive (HDD) or the like, and transfers these programs to respective memory areas for execution. The hardware resources 4 include a scanner 11, a plotter 12, and other hardware resources 13, which may include a facsimile and the like.

The software set 2 includes the application layer 5 and the platform layer 6, which are executed on an operating system (OS) such as UNIX (registered trademark). The application layer 5 includes programs for user-service-specific processes relating to image formation such as a printer, a copier, a facsimile, a scanner, a network file, etc.

The application layer 5 includes a printer application 21 used for a printer, a copier application 22 used for a copier, a facsimile application 23 used for a facsimile, a scanner application 24 used for a scanner, and a network file application 25 used for providing document services through networks.

The platform layer 6 includes a control service layer 9 which interprets a processing request from the application layer 5 to generate a request for acquiring the hardware resources 4, a system resource manager (SRM) 39 which manages one or more hardware resources 4 to arbitrate acquisition requests from the control service layer 9, and a handler layer 10 which manages the hardware resources 4 in response to the acquisition request from the SRM 39.

The control service layer 9 is configured to include one or more service modules such as a network control service (NCS) 31, a delivery control service (DCS) 32, an operation panel control service (OCS) 33, a fax control service (FCS) 34, an engine control service (ECS) 35, a memory control service (MCS) 36, a user information control service (UCS) 37, a system control service (SCS) 38, a remote service (RS) 42, and an on-demand update service (OUS) 43.

The platform layer 6 is configured to include API 53 through a preset function, which makes it possible to receive a processing request from the application layer 5. The OS executes processes in parallel with respect to the software of the application layer 5 and the software of the platform layer 6.

The process of the NCS 31 provides services which are used by applications that need network I/O. This process serves as an intermediary to distribute data to each application as the data is received through respective protocols from networks and to transmit data to the networks as the data is received from each application.

For example, the NCS 31 controls data communication with network apparatus connected through the networks by HTTP (HyperText Transfer Protocol) by use of the httpd (HyperText Transfer Protocol Daemon).

Moreover, the NCS 31 is further used in order to download an updating program from the networks.

The process of the DCS 32 controls distribution of accumulated documents and the like. The process of the OCS 33 controls an operation panel, which is used as an interface for communication between an operator and a control unit. The operation panel further serves as a means to input data as the operator operates the multifunction peripheral 1. The process of the FCS 34 provides API for performing fax transmission and reception through the PSTN or ISDN network for the application layer 5, the registration/referencing of various fax data stored in backup memory, fax scanning, received fax printing, etc.

The process of the ECS 35 controls engine units such as the scanner 11, the plotter 12, and the other hardware resources 13. The process of MCS 36 performs memory control of acquisition of a memory and release, use of HDD, etc. The process of the UCS 37 manages user information. The process of the RS 42 controls remote services. The process of the OUS 43 performs various processing relating to downloading, such as laying out of an updating program in the memory space after the program is downloaded.

The process of the SCS 38 attends to application management, operation-panel control, system screen display, LED display, hardware resource management, interruption application control, etc.

The process of the SRM 39 together with the SCS 3 attend to system control and the management of the hardware resources 4. For example, the process of the SRM 39 arbitrates in response to acquisition requests from the higher-order layers that are in need of using the hardware resources 4 such as the scanner 11 and the plotter 12, thereby performing execution control.

Specifically, the process of the SRM 39 checks whether the hardware resources 4 requested for acquisition are available (whether they are being used by other acquisition requests). If they are available, the process of the SRM 39 notifies the higher-order layer that the hardware resources 4 requested for acquisition are available. Moreover, the process of the SRM 39 attends to scheduling for use of the hardware resources 4 in response to the acquisition requests from the higher-order layers, and carries out what is requested (for example, paper feeding and imaging by the printer engine, memory allocation, file generation, etc.).

Moreover, the handler layer 10 includes a fax control unit handler (FCUH) 40 that controls and manages a fax control unit (FCU), which will be described later. The handler layer 10 further includes an image memory handler (IMH) 41, which is a memory-area management means to manage the allocation of memory areas to processes and to manage the memory areas assigned to the processes. The SRM 39 and the FCUH 40 issue a processing request to the hardware resources 4 by use of an engine I/F 54, which enables transmission of the processing request to the hardware resources 4 by use of a predefined function.

The multifunction peripheral 1 uses the platform layer 6 to achieve central processing of various processes required by each application. In the following, the hardware construction of the multifunction peripheral 1 will be described.

Figure 2:
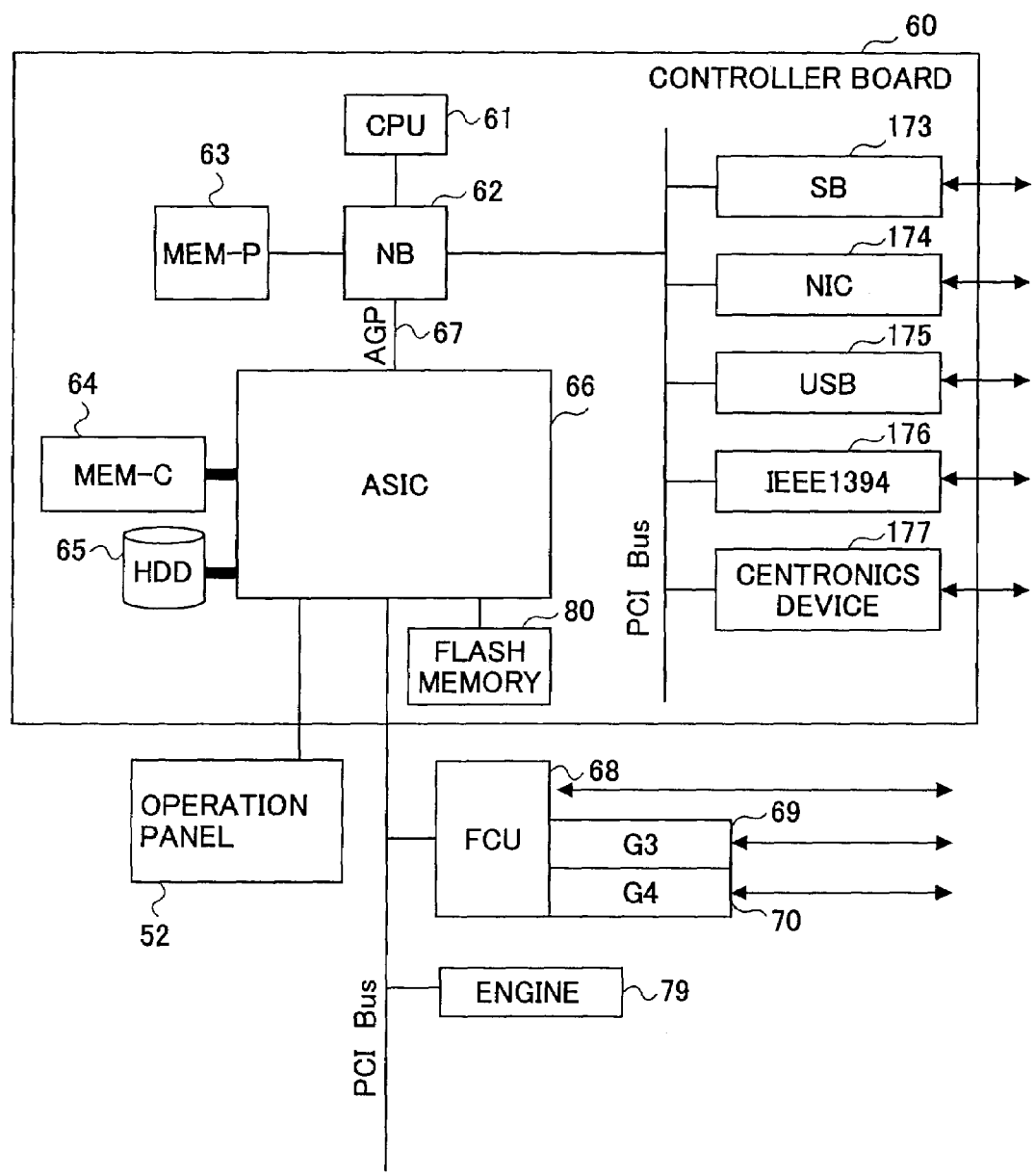
FIG. 2 is a block diagram showing a hardware construction of an embodiment of the multifunction peripheral.

FIG. 2 is a block diagram showing a hardware construction of an embodiment of the multifunction peripheral 1. The multifunction peripheral 1 includes a controller board 60, an operation panel 52, a FCU 68, and an engine 79. The FCU 68 includes a G3-standard complying unit 69 and a G4-standard complying unit 70.

The controller board 60 includes a CPU 61, an ASIC 66, a HDD 65, a system memory (MEM-P) 63, a local memory (MEM-C) 64, a flash memory 80, a north bridge (NB) 62, a south bridge (SB) 73, a NIC 174 (Network Interface Card), a USB device 175, an IEEE1394 device 176, and a Centronics device 177.

The operation panel 52 is connected to the ASIC 66 of the controller board 60. The SB 173, NIC 174, the USB device 175, the IEEE1394 device 176, and the Centronics device 177 are all connected to the NB 62 through the PCI bus.

The FCU 68 and the engine 79 are connected to the ASIC 66 of the controller board 60 through the PCI bus.

In addition, the controller board 60 has the local memory 64 and the HDD 65 connected to the ASIC 66, and the CPU 61 and ASIC 66 are connected through the NB 62 of a CPU chip set. Connecting the CPU 61 and the ASIC 66 together through the NB 62 in this manner makes it possible to cope with such a situation as the interface of the CPU 61 is not, released to the public.

The ASIC 66 and the NB 62 are connected not through the PCI bus but through AGP (accelerated graphics port) 67. In this manner, the ASIC 66 and the NB 62 are connected through the AGP 67 instead of the low-speed PCI bus, thereby avoiding a drop of performance when controlling the execution of one or more processes which form the application layer 5 and the platform layer 6 of FIG. 2.

The CPU 61 is responsible for overall control of the multifunction peripheral 1. The CPU 61 starts and executes the NCS 31, the DCS 32, the OCS 33, the FCS 34, the ECS 35, the MCS 36, the UCS 37, the RS 42, the OUS 43, the SCS 38, the SRM 39, the FCUH 40, the IMH 41, and the MEU 44 as processes on the OS, and also starts and executes the printer application 21, the copy application 22, the fax application 23, the scanner application 24, and the net-file application 25, which make up the application layer 5.

The NB 62 is a bridge for connecting the CPU 61, the system memory 63, the SB 173, and the ASIC 66. The system memory 63 is used as a picture-rendering memory of the multifunction peripheral 1. The SB 173 is a bridge for connecting the NB 62, the PCI bus, and peripheral devices. The local memory 64 is used as a copy-purpose image buffer and also as a code buffer. The flash memory 80 stores programs.

The ASIC 66 is an image-processing-purpose IC that includes hardware elements for image. The HDD 65 is a storage for storing images, document data, programs, font data, forms, etc. The operation panel 52 is operated by a user to receive input data from the user, and attends to display presentation to the user.

In the following, a process of downloading an updating program will be described as an example of the process of acquiring a memory area. Before that, however, a description will first be given of the term "process", the term "application", etc., which are used in the description.

In this embodiment, the terms "application", "module", and "process" are used. Since the term "process" generally represents a program that is being executed, the term "process" includes an "application" and a "module". Therefore, there is not an essential difference between these terms. In this embodiment, however, these terms will be used alternately according to what is being described.

In this embodiment, further, a program that is downloaded for acquisition is treated as an updating program. Such an updating program not only includes a program for updating the entirety of an existing program in the multifunction peripheral 1, but also includes a differential program for updating only part of the existing program or a merging program for merging with the existing program.

In what follows, a description will be given of a process of acquiring memory areas and downloading an updating program.

The multifunction peripheral 1 may receive a notice indicating the updating of a program from a server, which may be provided by a manufacturer of the multifunction peripheral 1, for example. In response, the multifunction peripheral 1 releases a memory area that has been used by a process, thereby securing a memory area for laying out the updating program. The updating program is then laid out in the acquired memory area. A description will first be given of a memory area.

The contents of memory areas are usually illustrated by using a memory map. The memory map refers to an illustration that shows which position stores what information.

Figure 3:
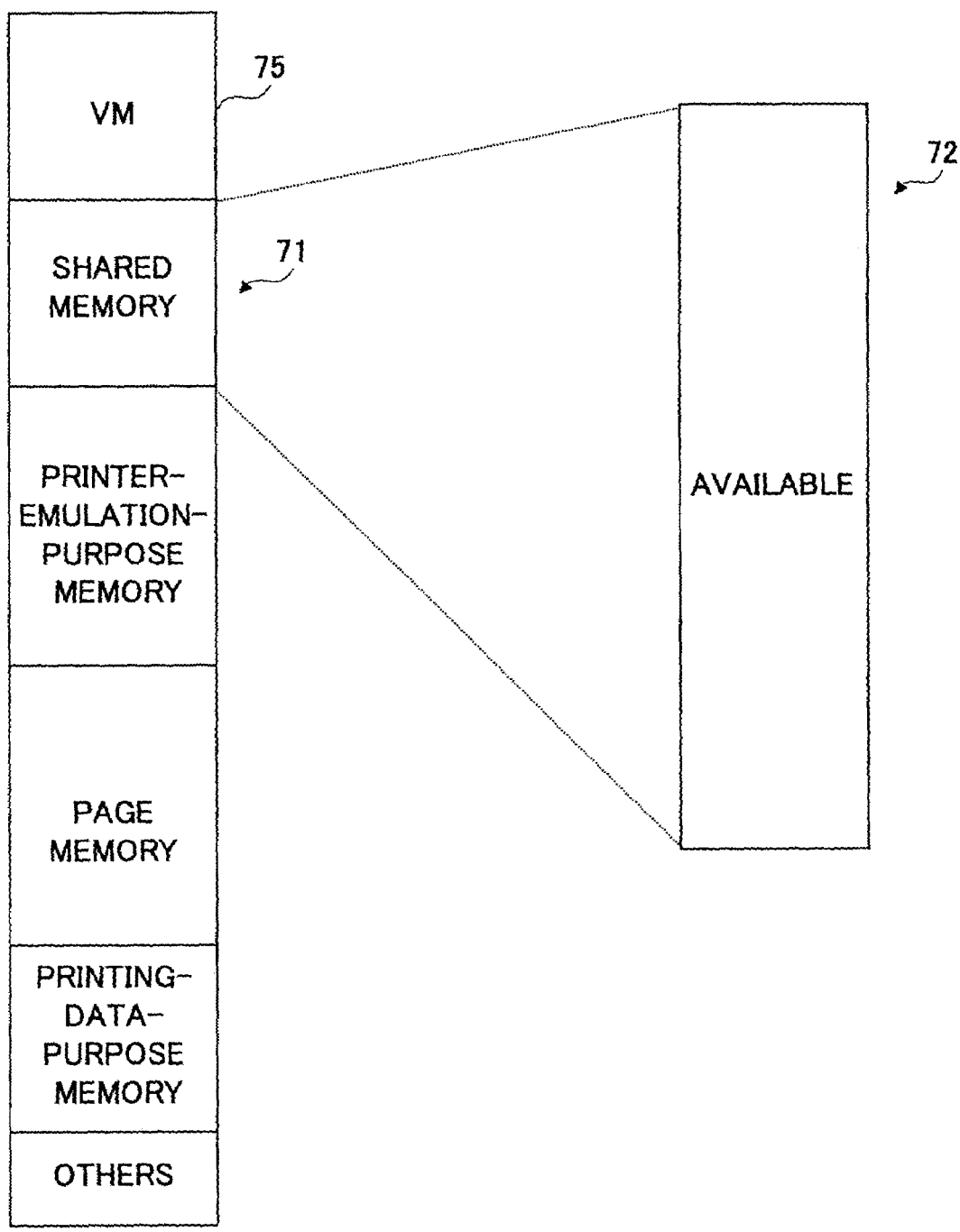
FIG. 3 is an illustrative drawing showing a memory map of a system memory which is a volatile memory device.

A memory area will be described by use of the memory map. FIG. 3 is an illustrative drawing showing a memory map 71 of the system memory 62 which is a volatile memory device. FIG. 3 also shows a memory map 72 which is an expanded view of the shared memory of the memory map 71, and also shows the memory area VM75. The memory areas shown in the memory maps 71 and 72 are controlled by the IMH 41, except for the memory area VM75. The memory area VM75 is controlled by the OS.

Use of the memory areas outside the control of the OS in this manner provides for the manufacturer of the multifunction peripheral 1 to arrange memory control that is tailored to the specification and characteristics of the multifunction peripheral 1. Further, causes of failures such as a memory leak can be suppressed.

The description that follows will be given with reference to a process that uses memory areas outside the control of the OS. It should be noted, however, that a similar process is also possible with respect to memory areas that are controlled by the OS.

The memory map 71 will be described below. As shown in the memory map 71, the system memory 62 has its memory area divided into sections such as a shared memory, a printer-emulation-purpose memory, a page memory, printing-data-purpose memory, and others.

The shared memory is an area where programs currently being executed are laid out, and is used by processes to run. Since the memory map 72 illustrated in FIG. 3 shows a state before a program is laid out, all the area is empty.

Figure 4:
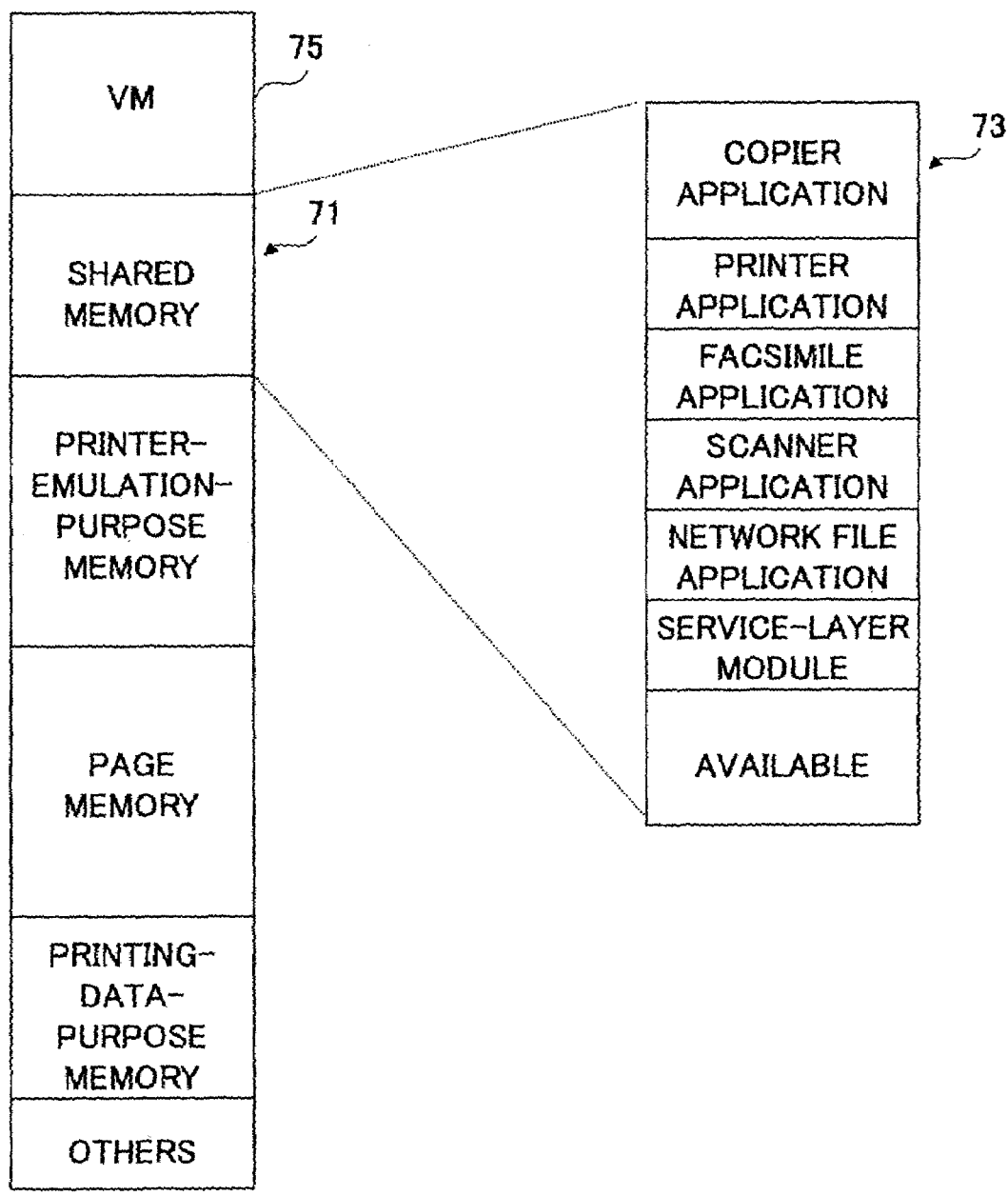
FIG. 4 is an illustrative drawing showing a memory map in which applications and modules are laid out in a shared memory that is empty in FIG. 3.

Upon the start of a process, the memory map changes into what is shown in FIG. 4. FIG. 4 is an illustrative drawing showing a memory map in which applications and modules are laid out in the shared memory that was empty in FIG. 3. The memory map 73 shows how applications such as the copy application and the printer application and modules of the service layer are laid out in memory areas.

Figure 5:
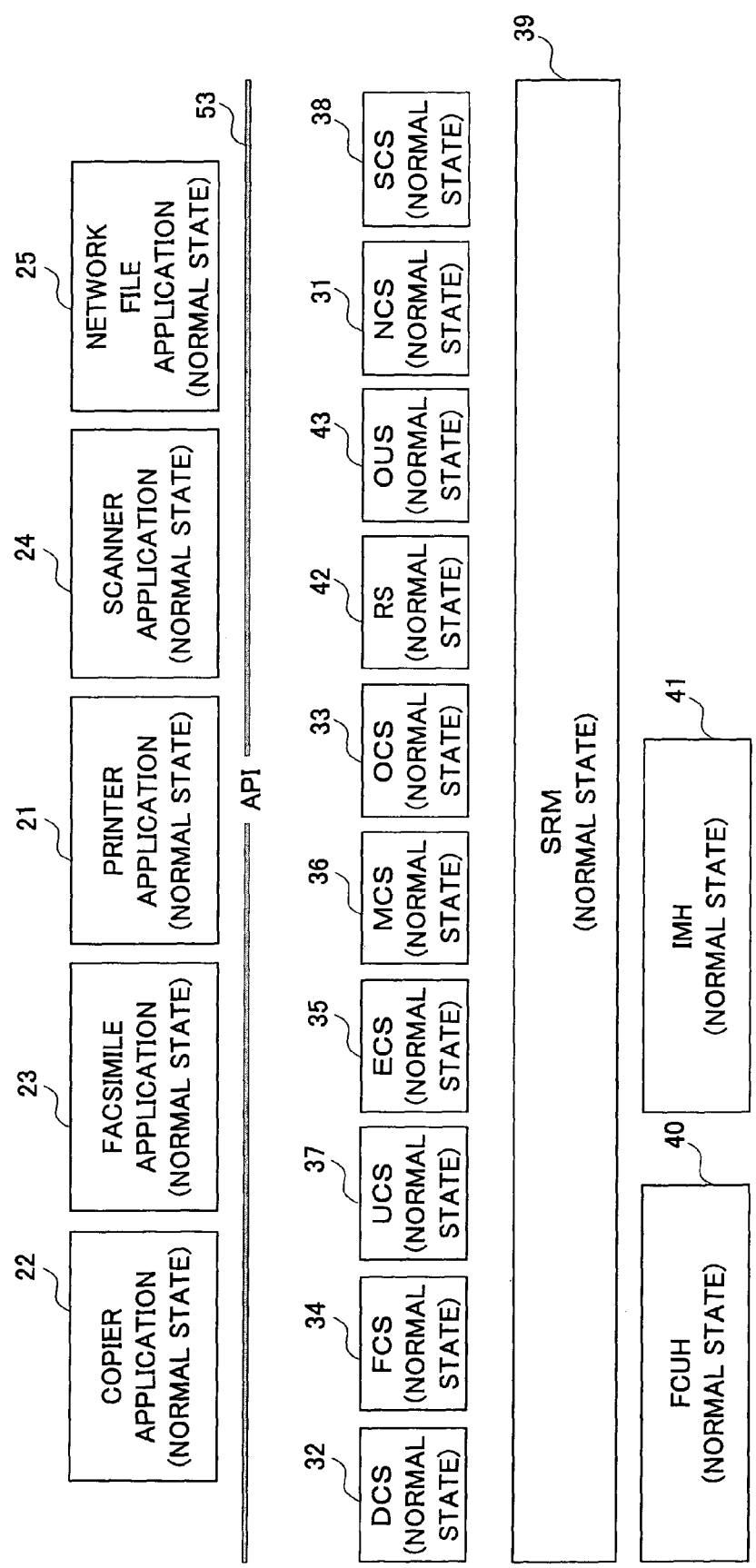
FIG. 5 is a drawing showing the state of processes that are laid out in memory areas as shown in FIG. 4.

FIG. 5 is a drawing showing the state of processes that are laid out in the memory areas as shown in FIG. 4. The state of each process shown in FIG. 5 is indicated inside the rectangle representing a process. In this example, all the processes are running in the "normal state".

Figure 6:
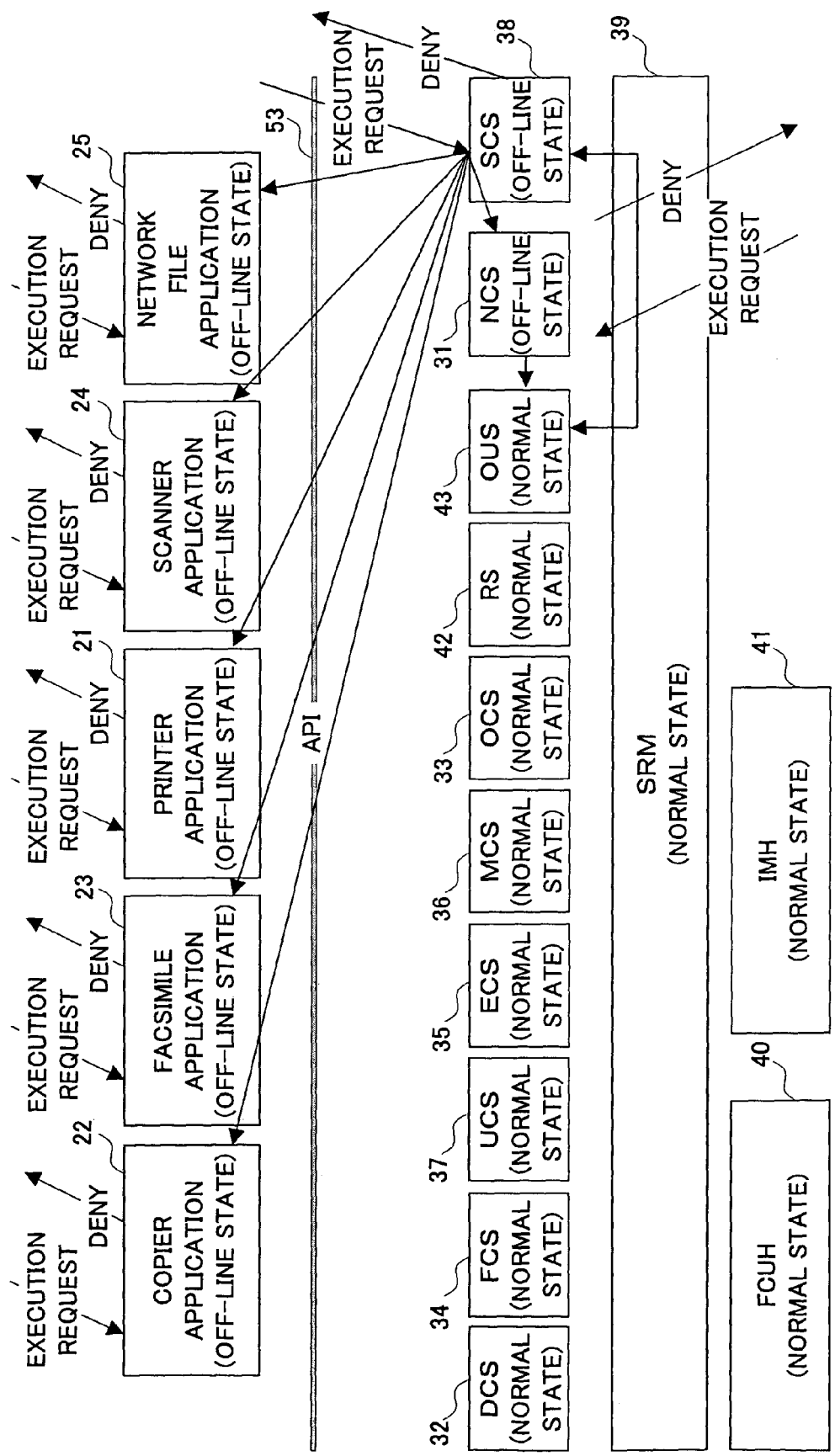
FIG. 6 is an illustrative drawing showing processes that are put in an off-line state.

Attention is now turned to a situation in which processes such as applications and part of the service layer modules are changed into the off-line state as shown in FIG. 6. The off-line state refers to a state in which a process is restricted in terms of the execution of processing (i.e., restriction is placed on the running of a process). Specifically, it refers to a state in which execution responsive to an external event is not permitted whereas the reception of a notice indicative of an engine state, a notice indicative of a malfunction, etc., is allowed.

To be more specific, applications and service-layer modules will be restricted in respect of the execution of processes as shown in FIG. 7. The copy application 22, for example, does not carry out processes concerning scanning, printing, and LS accumulation. The facsimile application 23 does not perform processes relating to transmission, reception, LS accumulation, and printing of received documents. The printer application 21 does not attend to processing concerning printing and LS accumulation. The scanner application 24 does not carry out processes relating to scanning and LS accumulation. The net-file application 25 does not perform processing concerning printing and LS accumulation. The SCS 38 masks operation-unit events, and refuses a request for job execution. The NCS 31 refuses a communication event.

It is possible to cancel the off-line state. In such a case, a process will be allowed to execute formerly restricted processing. Even when operating in the off-line state, applications save a notice sent from other applications or the like. After restriction on the processing execution is lifted, the applications can resume processing based on the saved contents.

As described above, the restriction of processing execution in the off-line state is limited as to its scope in that the cancellation of restriction will enable the restricted processing to be executable again. Accordingly, the processing to be restricted can be arbitrarily defined within the limit as prescribed above.

Figure 8:
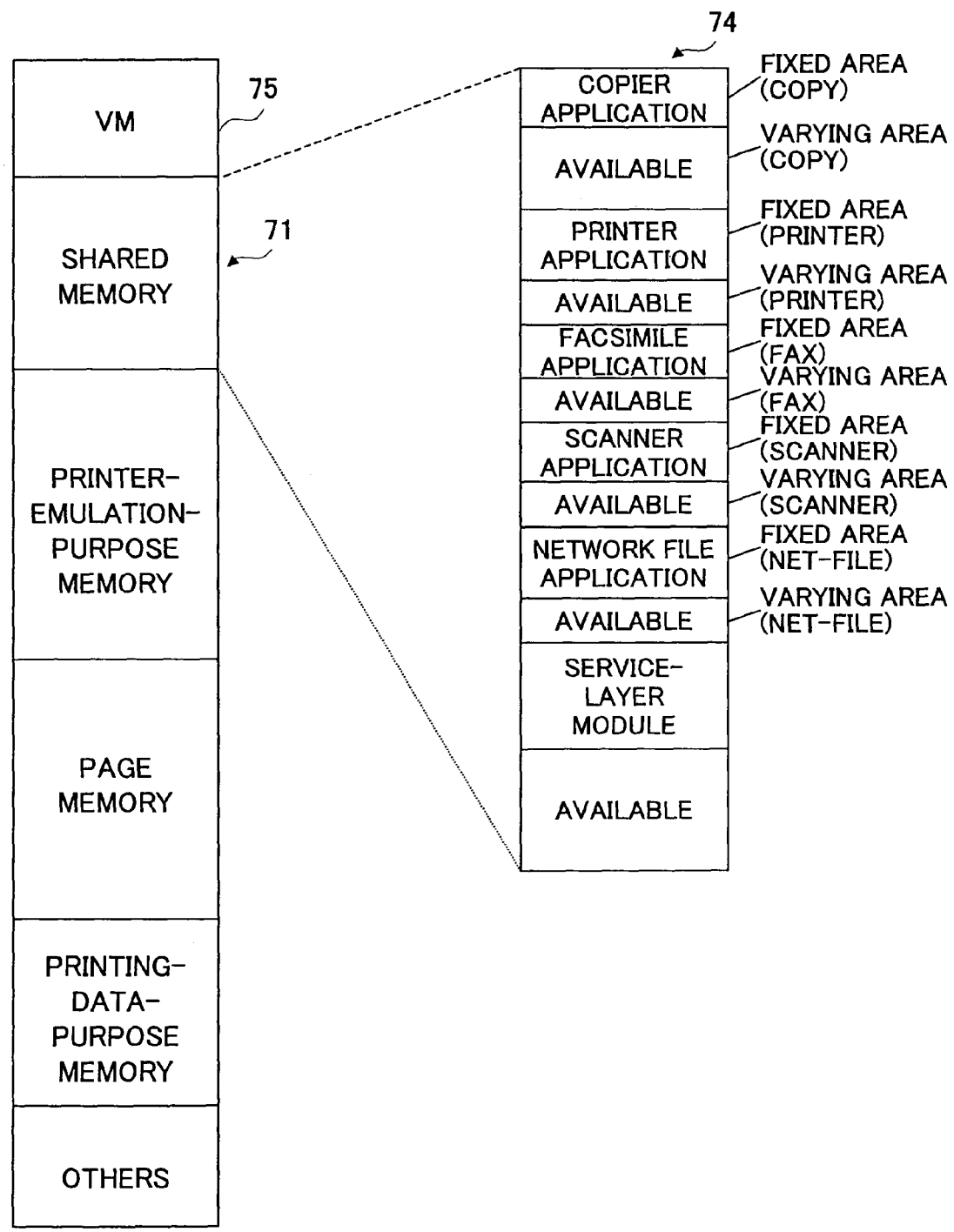
FIG. 8 is an illustrative drawing showing a memory map.

After putting a process into the off-line state, the SCS 38 releases a memory area that has been used by the process. FIG. 8 is an illustrative drawing showing a memory map. With reference to the memory map 74 shown in FIG. 8, a description will be given of the memory area that has been used by the process. The memory map 74 illustrates the way the memory area appears after the process releases the memory area.

As shown in the memory map 73 (see FIG. 4), applications and modules have their respective areas assigned in the system memory 63. Each assigned memory area is further comprised of two areas. In this embodiment, these two areas are referred to as a fixed area and a varying area. The fixed area stores information that is necessary regardless of whether the corresponding application executes a job. Such information may include a notice indicative of a state of the engine 79 (see FIG. 2). If the state of the engine 79 is not stored, the state of the engine 79 cannot be identified when the process resumes after the cancellation of the off-line state. This may cause a malfunction.

The varying area is a memory area that has been used by the process, and is required by an application or module when it runs. An example of the usage of this memory area includes using it as a temporary storage of image information and using it as storage of information regarding current processing.

In this embodiment, the varying area is defined as described above. This definition, however, is only an example, and various definitions may be given according to differing scopes of processing restriction as previously described.

With reference to FIG. 8 again, free memory spaces are obtained as shown in FIG. 8 after the varying areas are released. In what follows, the termination of a process will be described as a means to secure the releasing of a fixed area.

When a process is to be performed, the OS lays out the program in the memory space, and registers the process for continuation of its existence. When there is no need to keep the process, the OS eliminates the registration of the process.

In this embodiment, termination of a process means the elimination of process registration. When a process is terminated, the area assigned to the process including the laid-out program will be freed. In this embodiment, this area assigned to a process is a fixed area as previously described.

Figure 9:
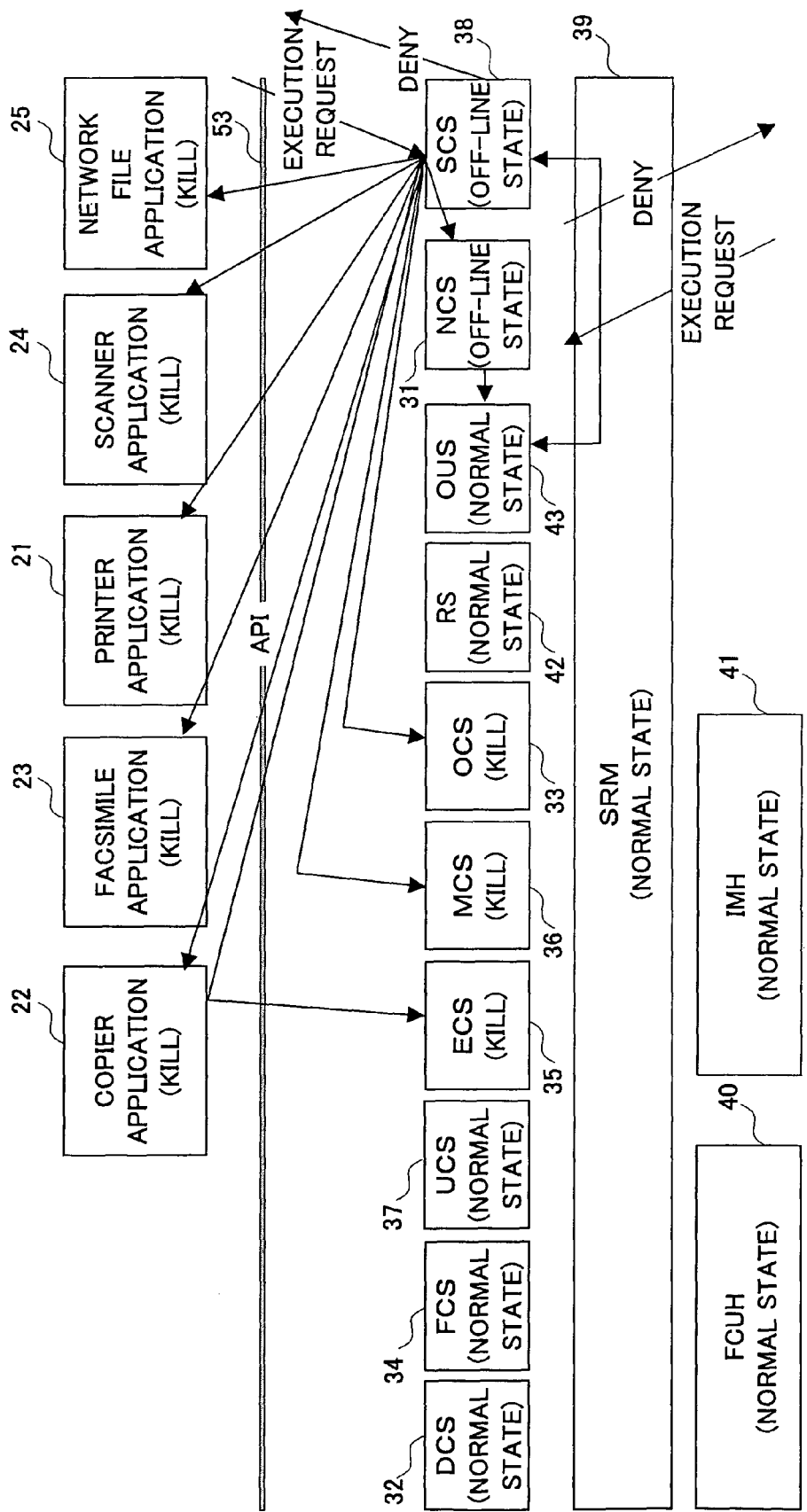
FIG. 9 is an illustrative drawing showing processes that are terminated.
Figure 10:
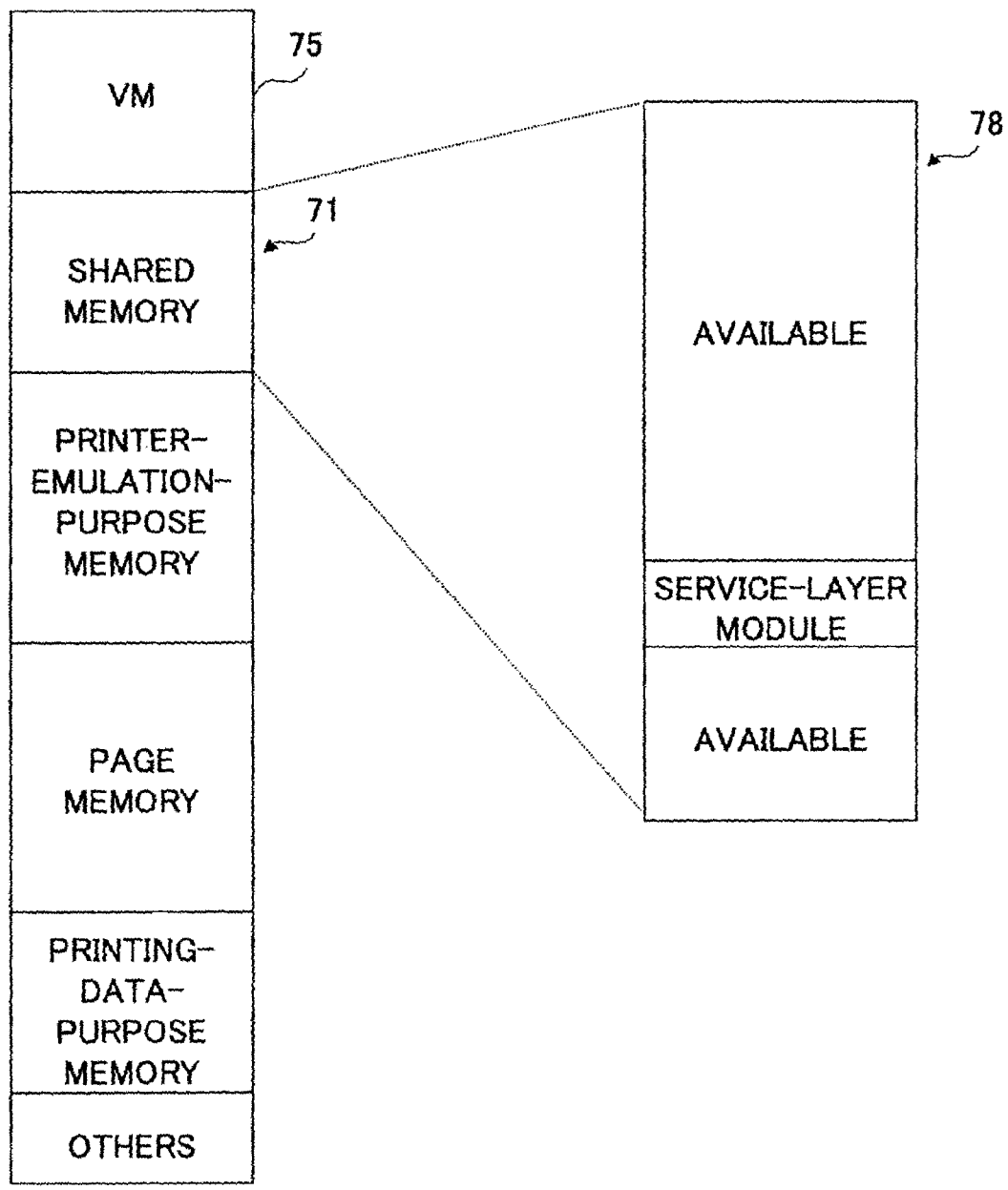
FIG. 10 is an illustrative drawing showing a memory map.

When a process is terminated, the state of processes as shown in FIG. 5 will be changed to the state of processes as shown in FIG. 9. The state of processes shown in FIG. 9 illustrates a situation where all the applications are terminated. The terminated applications are shown by the dotted lines. When this happens, all the memory areas are freed, except for the memory areas assigned to the service-layer modules which are not released, as shown in the memory map 78 of FIG. 10.

The free area obtained in this manner will be used as a memory area where a downloaded updating program is laid out. This makes it possible to download the updating program without preparing a memory area in advance for downloading the updating program.

Moreover, the downloaded updating program is stored in the flash memory 69 as a new program.

Figure 11:
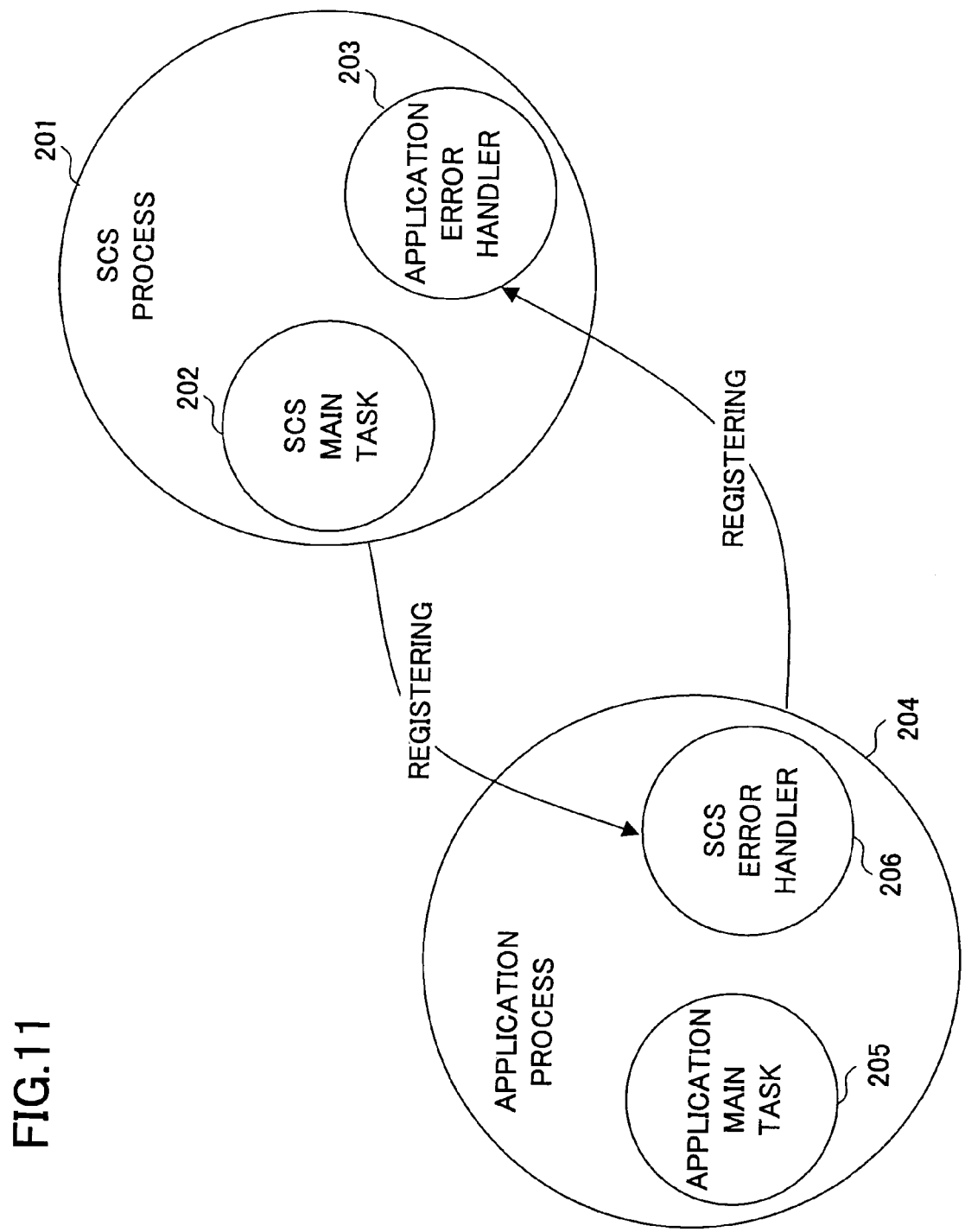
FIG. 11 is an illustrative drawing showing a process of an SCS and a process which constitutes an application.

In the following, a process associated with the termination of a process will be described with reference to the SCS 38 and an application. FIG. 11 is an illustrative drawing showing a process 201 of the SCS 38 and a process 204 which constitutes an application. In the process 201 of the SCS 38, a main task 202 of the SCS 38 and an application error handler 203 are shown. In the process 204 which constitutes an application, an application main task 205 and an SCS error handler 206 are shown.

Figure 12:
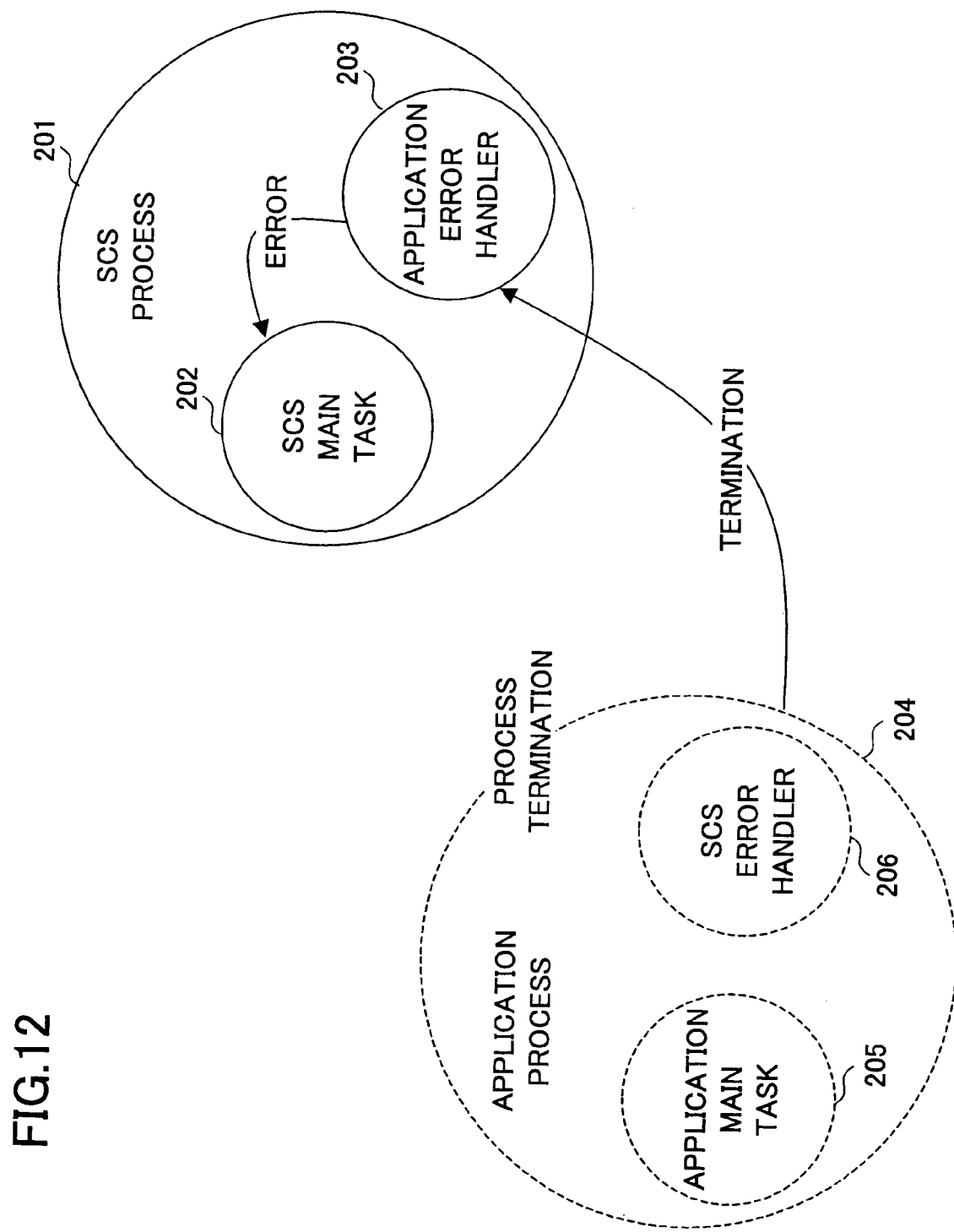
FIG. 12 is an illustrative drawing showing a case in which an application process is terminated.

The process 201 and the process 204 register the error handler belonging to each other at the start of processes as shown in FIG. 11. In this case, these error handlers serve to check the existence of each other. When a process 204 is terminated as shown in FIG. 12, thus, the application error handler 203 of the SCS 38 recognizes that the process 204 has been terminated, thereby issuing an error.

Figure 13:
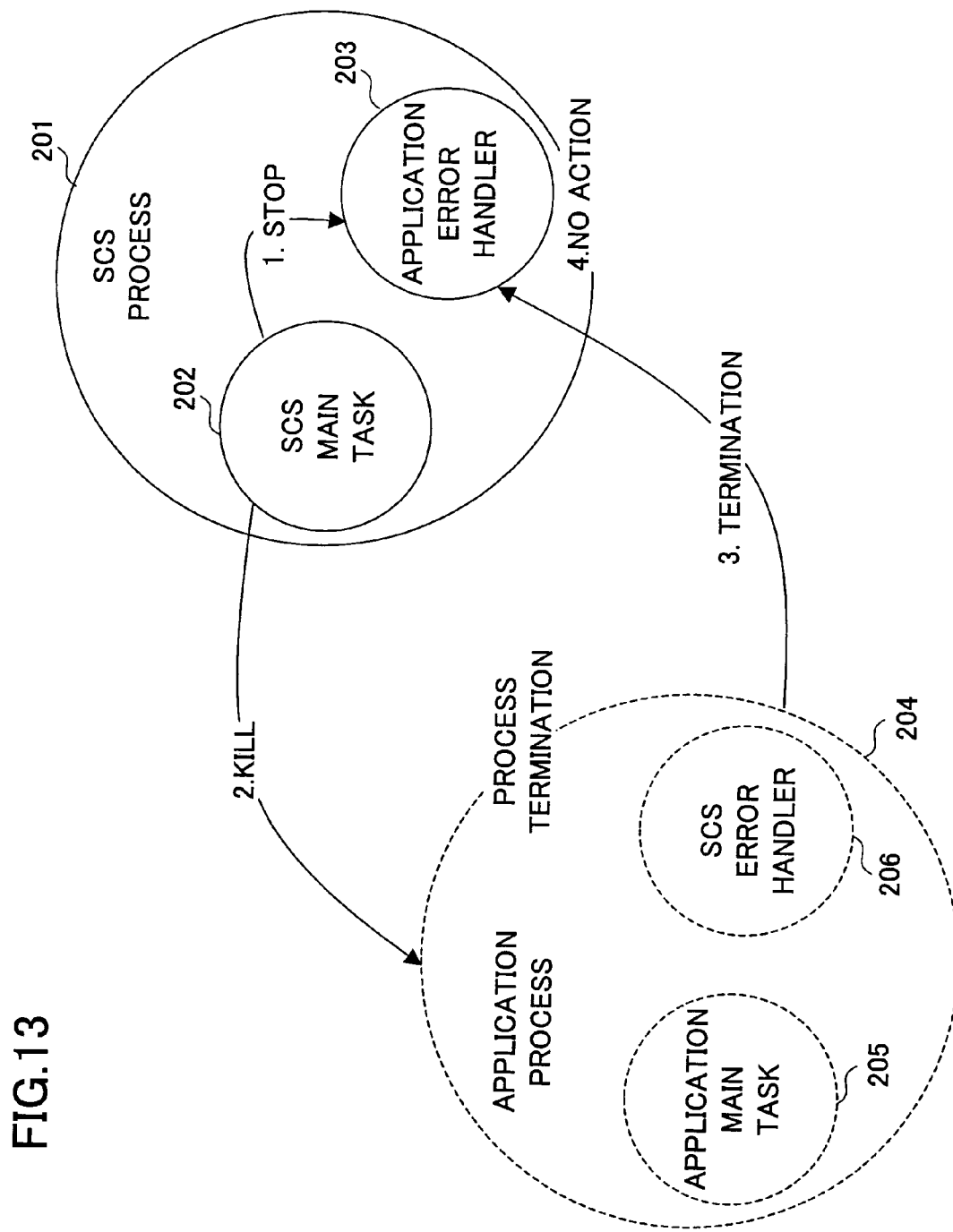
FIG. 13 is an illustrative drawing showing a case in which an application process is terminated after an application error handler is stopped.

In consideration of this, the SCS 38 terminates (kills) an application process after stopping the application error handler as shown in FIG. 13 in order to avoid an error. With this provision, the SCS 38 can avoid issuing an error even when the application process is terminated since the application error handler has been stopped. Here, "KILL" shown in FIG. 13 refers to a command that terminates a process.

With the termination of a process in-this manner, the fixed area and the varying area that were assigned to this process become available as free areas. The SCS 38 thus can release the fixed area and the varying area.

With this provision, it becomes possible to secure an increased memory area in the memory space controlled by application software.

The obtained free area will then be used as a memory area where a downloaded updating program is laid out. The downloaded updating program is then stored in the flash memory 80 as a new program.

In the following, a description will be given of a process of releasing a memory area and downloading. As described above, the releasing of a memory area includes two types of actions, releasing a varying area by putting the process in the off-line state and releasing both a fixed area and a varying area by terminating the process. These actions will be described separately.

First, a description will be given of a process of releasing a varying area by putting a process in the off-line state.

Figure 14:
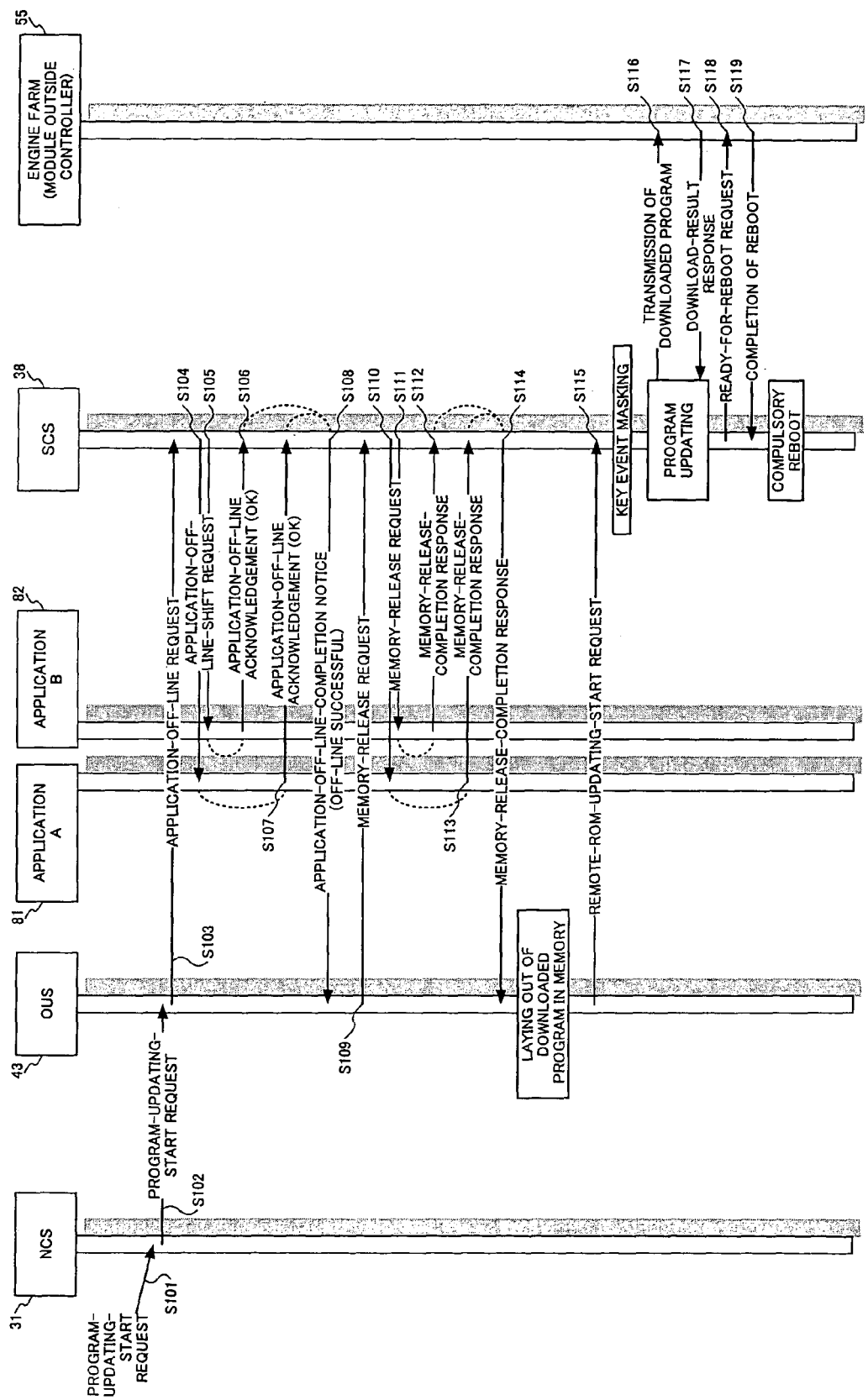
FIG. 14 is a sequence chart showing the process of putting two applications in the off-line state to release memory areas and downloading an updating program for updating a program stored in a flash memory of the multifunction peripheral.

FIG. 14 is a sequence chart showing the process of putting two applications (an application A 81 and an application B 82) in the off-line state to release the memory area and downloading an updating program for updating a program stored in the flash memory 69 in the multifunction peripheral 1. This process is performed by the NCS 31 corresponding to a communication means, the OUS 43 corresponding to a data laying-out means, the SCS 38 corresponding to a memory area releasing means, an off-line means, a process terminating means, and a program updating means, and the engine farm 55. Here, the engine farm refers to firmware provided in the engine.

In what follows, a description will be given of the sequence chart. At step S101, the NCS 31 is notified of the start of program updating from the network. At step S102, the NCS 31 notifies the OUS 43 of the start of program updating. Having received the notice, the OUS 43 sends an application-off-line request to the SCS 38 at step S103. The application-off-line request serves to request that an application be put in the off-line state as previously described.

The application-off-line request is also sent to an application through the SCS 38. In response to the request, the application must shift to the off-line state unless it is currently attending to an operation as an application.

The term "operation as an application" refers to an operation that performs a copying process if the copy application 22 is taken as an example.

Accordingly, the copy application 22 must shift to the off-line state unless the copy application 22 is currently performing a copying process.

With reference to the sequence chart again, the SCS 38 having received the application-off-line request from the OUS 43 sends an application-off-line-shift request to the application A 81 and the application B 82 at step S104 and step S105, respectively.

The application A 81 and the application B 82 having received the application-off-line-shift request send an application-off-line acknowledgement (OK) to the SCS 38 to indicate that a shift to the off-line state has been made if such a shift is possible. In an example of this sequence chart, the application A 81 and the application B 82 can shift to the off-line state, so that the application A 81 and the application B 82 send an application-off-line acknowledgement (OK) to the SCS 38 at step S106 and step S107, respectively.

Having received the application-off-line acknowledgements (OK), the SCS 38 sends an application-off-line-completion notice to the OUS 43 at step S108 to indicate that the applications are put in the off-line state.

Having received the application-off-line-completion notice, the OUS 43 transmits a memory-release request to the SCS 38 at step S109. This request is aimed at having a varying area of an application released after the application shifts to the off-line state.

In response to the memory-release request, the SCS 38 transmits a memory-release request to the application A 81 and the application B 82 at step S110 and step S111, respectively. Having received the memory-release request, the application A 81 and the application B 82 release a memory area, and send a memory-release-completion notice to the SCS 38 at step S112 and step S113, respectively.

Having received the memory-release-completion notices, the SCS 38 transmits a memory-release-completion notice to the OUS 43 at step S114 as an indication that the release of memory areas has been completed. In response to the memory-release-completion notice, the OUS 43 downloads an updating program, and lays out the updating program in the memory areas that are obtained by the releasing of memory areas.

The OUS 43 sends a remote-ROM-updating-start request to the SCS 38 at step S115 to request the start of program updating. In response to the remote-ROM-updating-start request, the SCS 38 masks key events. The masking of key events invalidates the operation panel 52, so that events are not accepted when the events occur upon the pressing of keys displayed on the the operation panel 52.

Thereafter, the SCS 38 transmits the downloaded updating program to the engine farm 55 at step S116 in order to update a program. The engine farm 55 updates a program and notifies the SCS 38 of the updating results at step S117.

When the results of updating a program are reported, the SCS 38 sends a ready-for-reboot request to the engine farm 55 at step S118. At step S119, the SCS 38 carries out a compulsory reboot to terminate the program updating in response to a notice from the engine farm 55 indicating the completion of reboot preparation.

In this manner, the SCS 38 releases a memory area used by an application, and the OUS 43 downloads an updating program for updating a program by use of the NCS 31, followed by the SCS 38 laying out the updating program in the released memory area.

Step S103 through step S108 of the flowchart described above correspond to an off-line step, and step S109 through step S114 correspond to a memory-area releasing step. Further, the laying out of a downloaded program in the memory by the OUS 43 following step S114 corresponds to a data laying-out step.

In what follows, a description will be given of processes performed by the OUS 43, the SCS 38, and an application with reference to respective flowcharts.

Figure 15:
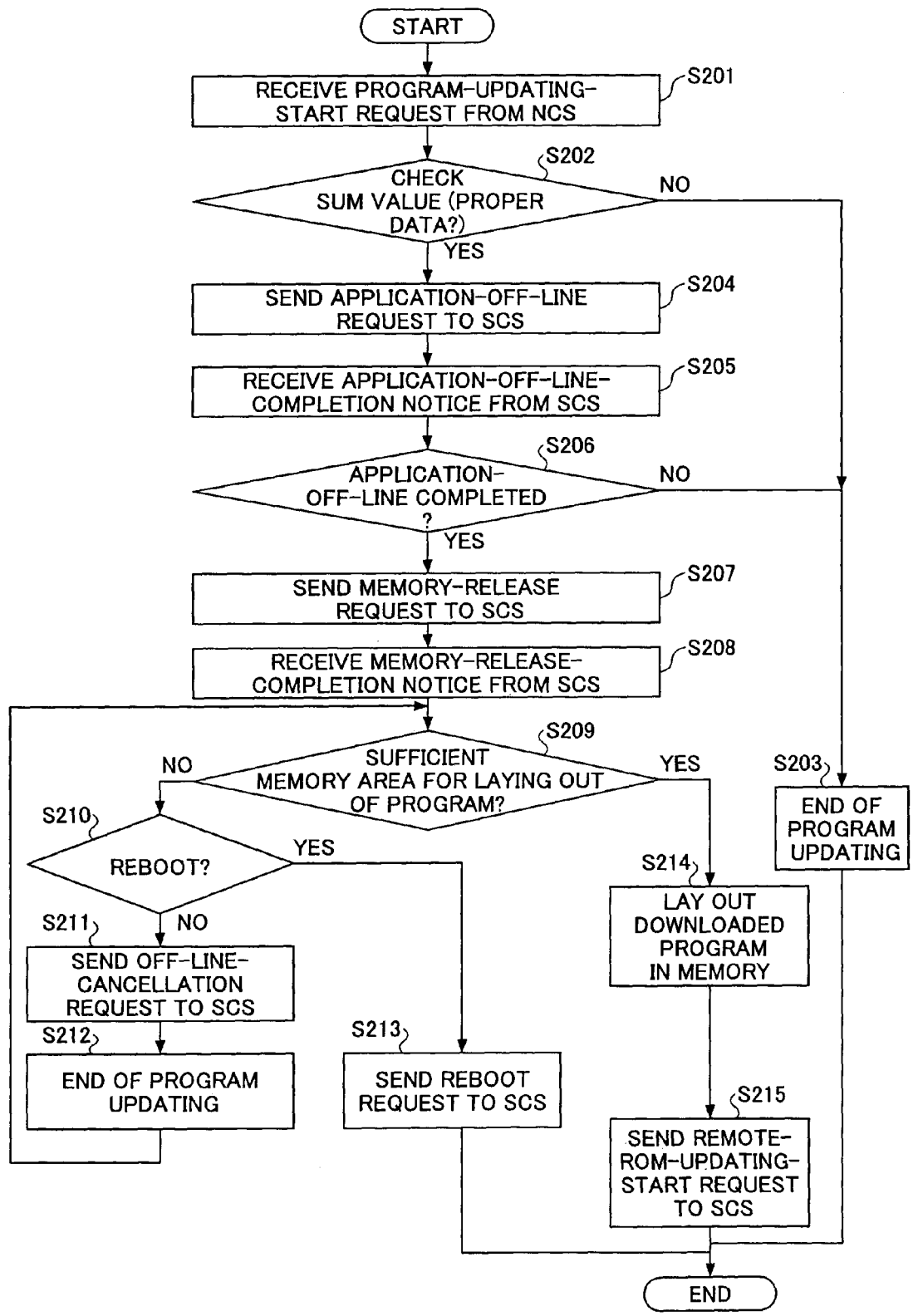
FIG. 15 is a flowchart of a process performed by an OUS.

FIG. 15 is a flowchart of a process performed by the OUS 43. At step S201, the OUS 43 receives a notice indicative of the start of program updating from the NCS 31. At step S202, the OUS 43 checks a SUM value in order to determine whether the received notice indicative of the start of program updating is proper data. If the notice indicative of the start of program updating is not proper data, the program updating comes to an end at step S203.

If step S202 finds that the notice indicative of the start of program updating is proper data, the OUS 43 sends an application-off-line request to the SCS 38 at step S204 to put an application in the off-line state. Receiving an application-off-line-completion notice at step S205 as a response to the application-off-line request, the OUS43 checks whether the application off-line processing is completed. The process of step S206 is necessary in order to put an end to the program updating at step S203 when it is notified that the application-off-line processing is not completed.

If step S206 finds that the application-off-line processing is completed, the OUS 43 sends a memory-release request to the SCS 38 at step S207. Receiving a memory-release-completion notice from the SCS 38 at step S208, the OUS 43 checks at step S209 whether a memory area required for the laying out of an updating program has been secured.

If the OUS 43 finds that a memory area was not secured, the OUS 43 decides at step S210 whether to reboot. If the OUS 43 decides not to reboot, the OUS 43 cancels the off-line state by sending an off-line-cancellation request to the SCS 38 at step S211, and puts an end to the program updating at step S212.

If step S210 finds that the OUS 43 should reboot, the OUS 43 sends a reboot request to the SCS 38 in order to reboot the multifunction peripheral 1. The procedure then comes to an end.

If step S209 ascertains that a memory area required for the laying out of a program is secured, the OUS 43 lays out the downloaded program in the memory at step S214. At step S215, the OUS 43 sends a remote-ROM-updating-start request to the SCS 38 to request the start of program updating. The procedure then comes to an end.

Figure 16:
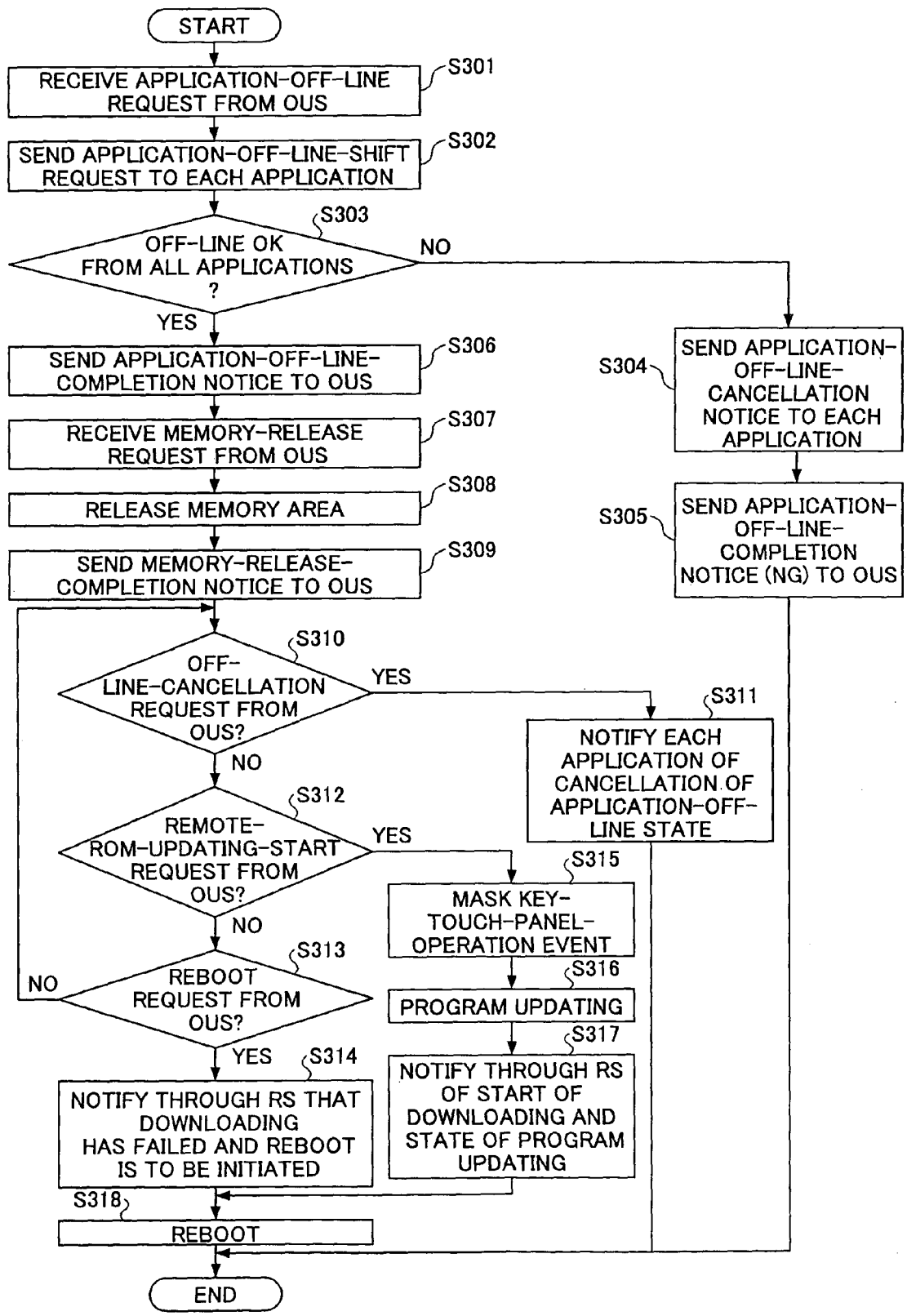
FIG. 16 is a flowchart of a process performed by the SCS.

FIG. 16 is a flowchart of a process performed by the SCS 38. At step S301, the SCS 38 receives an application-off-line request from the OUS 43. In response to the application-off-line request, the SCS 38 transmits an application-off-line-shift request to each application at step S302.

At step S303, the SCS 38 checks whether an application-off-line acknowledgement (OK) is received from all the applications. If it is not the case, the SCS 38 sends an application-off-line-cancellation notice to each application at step S304. As a result, the applications disengage from the off-line state, thereby being allowed to perform formerly restricted processing. At step S305, the SCS 38 sends an application-off-line-completion notice to notify the OUS 43 that the applications did not shift to the off-line state. The procedure then comes to an end.

If it is found at step S303 that all the applications send an application-off-line acknowledgement (OK), the SCS 38 sends an application-off-line-completion notice to the OUS 43 at step S306.

Receiving a memory-release request from the OUS 43 at step S307, the SCS 38 releases memory areas at step S308, and transmits a memory-release-completion notice to the OUS 43 at step S309.

After transmitting the memory-release-completion notice to the OUS 43, processing by the SCS 38 branches according to requests from the OUS 43. If an off-line-cancellation request is received from the OUS 43, the SCS 38 moves from step S310 to step S311, and notifies each application of the cancellation of an application-off-line state. Then, the procedure comes to an end.

If the SCS 38 does not receive an off-line-cancellation request from the OUS 43 at step S310, the SCS 38 checks at step S312 whether a remote-ROM-updating-start request is received from the OUS 43. If the SCS 38 receives the remote-ROM-updating-start request, the SCS 38 masks events concerning key-touch-panel operations on the operation panel 52 at step S315, thereby masking key events.

In this manner, the operation panel 52 is invalidated when updating a program, thereby insuring that the updating process is carried out at high speed. Further, since unrestricted functions can still be performed, vital functions or the like may be carried out even when a program is being updated.

At step S316, the SCS 38 updates a program. The SCS 38 then notifies a service center or the like of the start of downloading and the state of program updating through the RS 42 and the network. The SCS 38 then reboots at step S318. With this, the procedure comes to an end. Here, the service center may be a server for maintenance and checking of the multifunction peripheral 1 at the manufacturer site, or may be a server provided at the site which distributes the updating program. Moreover, information indicative of the state of each application and module may be transmitted to the service center. The service center may record a log.

If a remote-ROM-updating-start request is not received at step S312, the SCS 38 checks at step S313 whether a reboot request is received from the OUS 43. If the SCS 38 does not receive a reboot request, the SCS 38 performs the process of step S310 again. If the SCS 38 receives a reboot request, at step S314, the SCS 38 notifies the service center or the like through the RS 42 and the network that downloading has failed and a reboot is to be initiated. A reboot is carried out at step S318. With this, the procedure comes to an end.

Figure 17:
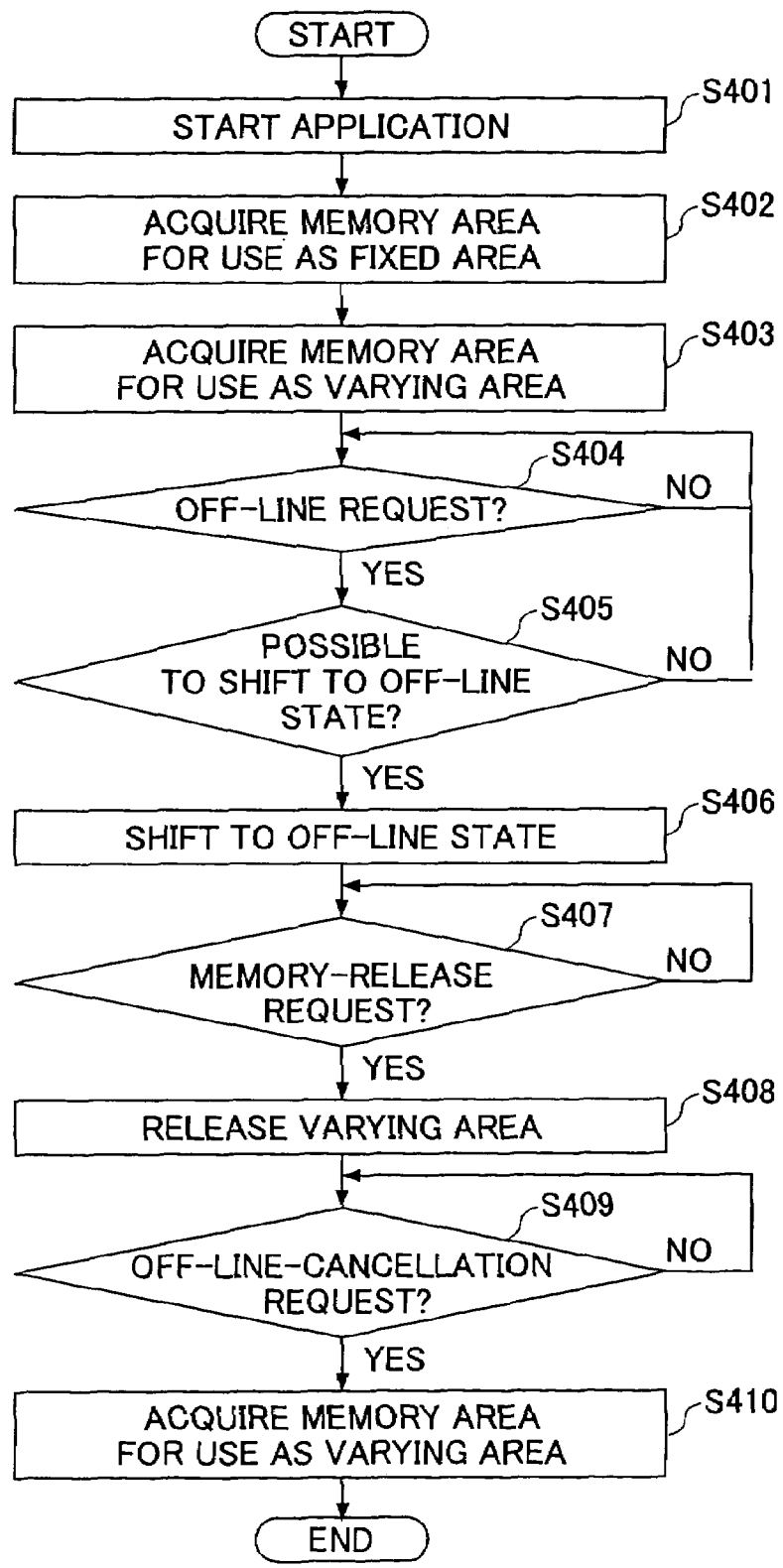
FIG. 17 is a flowchart showing a process performed by an application.

FIG. 17 is a flowchart showing a process performed by an application such as the application A 81 and the application B 82. Step S401 illustrates the start of an application. At step S402, the application acquires a memory area to be used as a fixed area as previously described. At step S403, the application acquires a memory area to be used as a varying area. A normal process is thus ready to commence.

At step S404, the application responds to an off-line request sent from the SCS 38 by checking at step S405 whether a shift to the off-line state is possible. If a shift to the off-line state is not possible, the application returns to step S404. If a shift to the off-line state is possible, the application shifts to the off-line state at step S406.

The application which has shifted to the off-line state checks at step S407 whether a memory-release request is received from the SCS 38. If it is received, the application releases a memory area used as the varying area at step S408. The application which has released the memory area checks at step S409 whether an off-line-cancellation request is received from the SCS 38. If it is received, the application acquires a memory area to be used as a varying area at step S410, thereby making it possible to perform formerly restricted processing.

Figure 18:
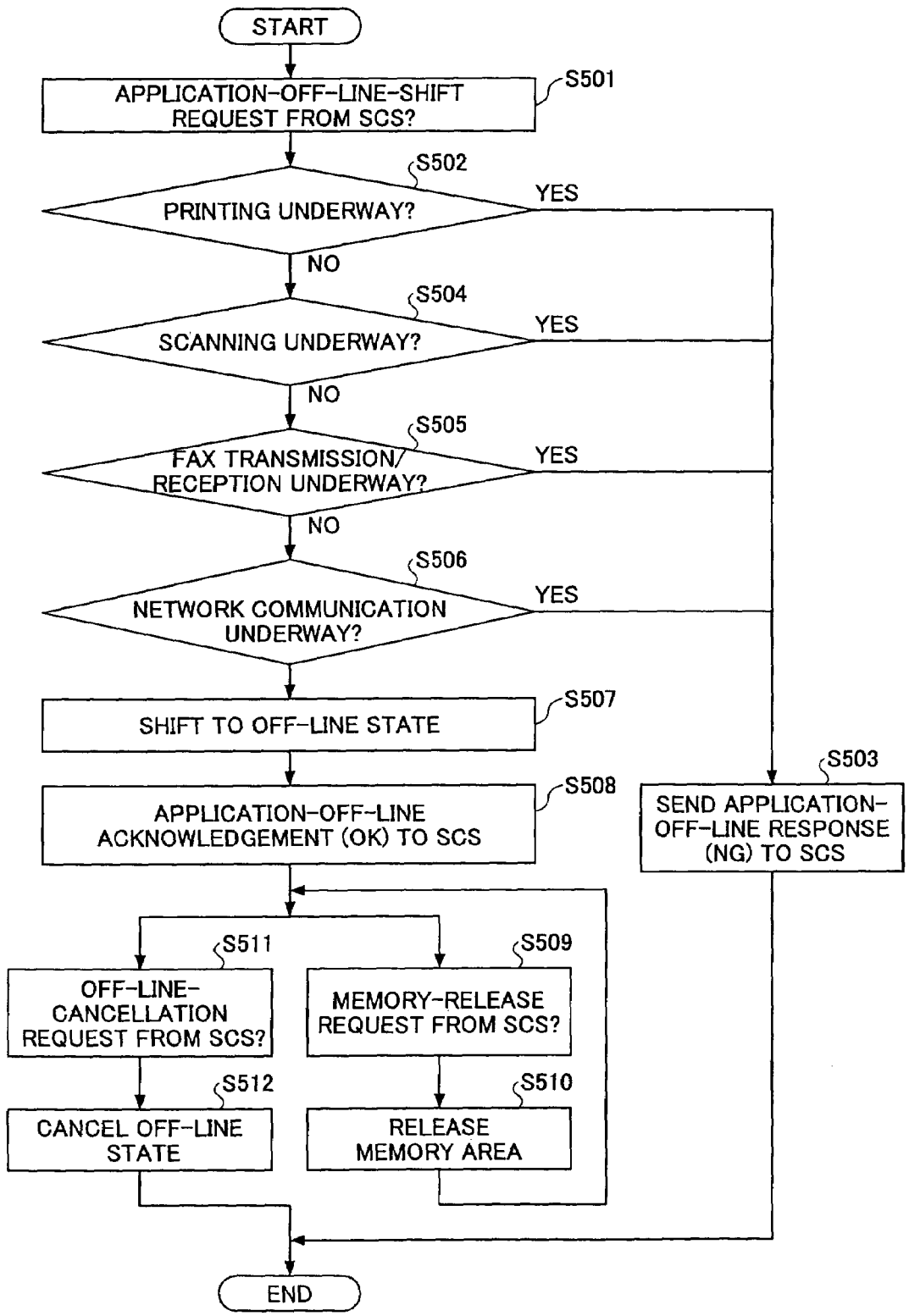
FIG. 18 is a flowchart showing a process performed by an application to check whether it is possible to shift to the off-line state.

FIG. 18 is a flowchart showing a process performed by an application to check whether it is possible to shift to the off-line state. At step S501, the application receives an application-off-line-shift request from the SCS 38. In response to application-off-line-shift request, the application checks from step S502 to step S506 whether predefined operations are being performed.

Checking of operations from step S502 to step S506 is made with respect to a printing operation, a scanning operation, a facsimile transmission/reception operation, and a network communication operation in this listed order. If any one of these operations is currently underway, the application sends an application-off-line negation (NG) to the SCS 38 at step S503 to indicate that a shift to the off-line state cannot be made. With this, the procedure-come to an end.

If checks at step S502 through step S506 find that none of these operations is underway, the application shifts to the off-line state at step S507. At step S508, the application sends an application-off-line acknowledgement (OK) to the SCS 38.

The application that has shifted to the off-line state then waits for a request from the SCS 38. In this wait state, the application receives a memory-release request from the SCS 38 at step S509. In response, the application releases a memory area at step S510, thereafter lapsing into the wait state again.

Receiving an off-line-cancellation request from the SCS 38 at step S511, the application disengages from the off-line state at step S512.

Figure 19:
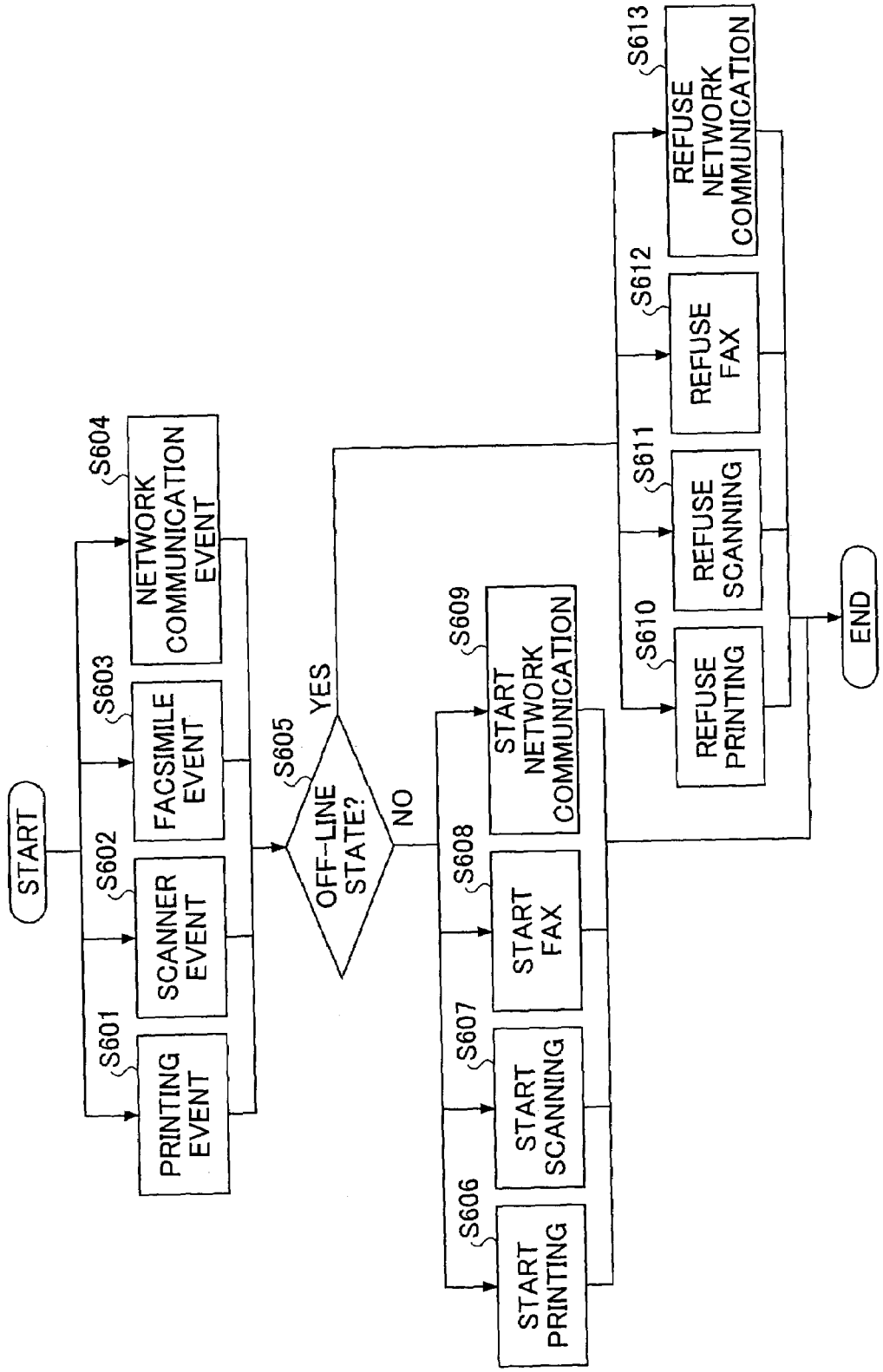
FIG. 19 is a flowchart showing a process performed by an application in response to an event after shifting to the off-line state.

FIG. 19 is a flowchart showing a process performed by an application in response to an event after shifting to the off-line state. Step S601 through step S604 represent the occurrence of events, i.e., a printing event, a scanner event, a facsimile event, and a network communication event, respectively.

The application then checks at step S605 whether it is in the off-line state. If the application is in the off-line state, the application refuses to respond to an event that has occurred in one of steps S610 through S613.

If it is found at step S605 that the application is in the off-line state, the application responds to an event occurring at one of steps S606 through S609 by attending to required processing.

Figure 20:
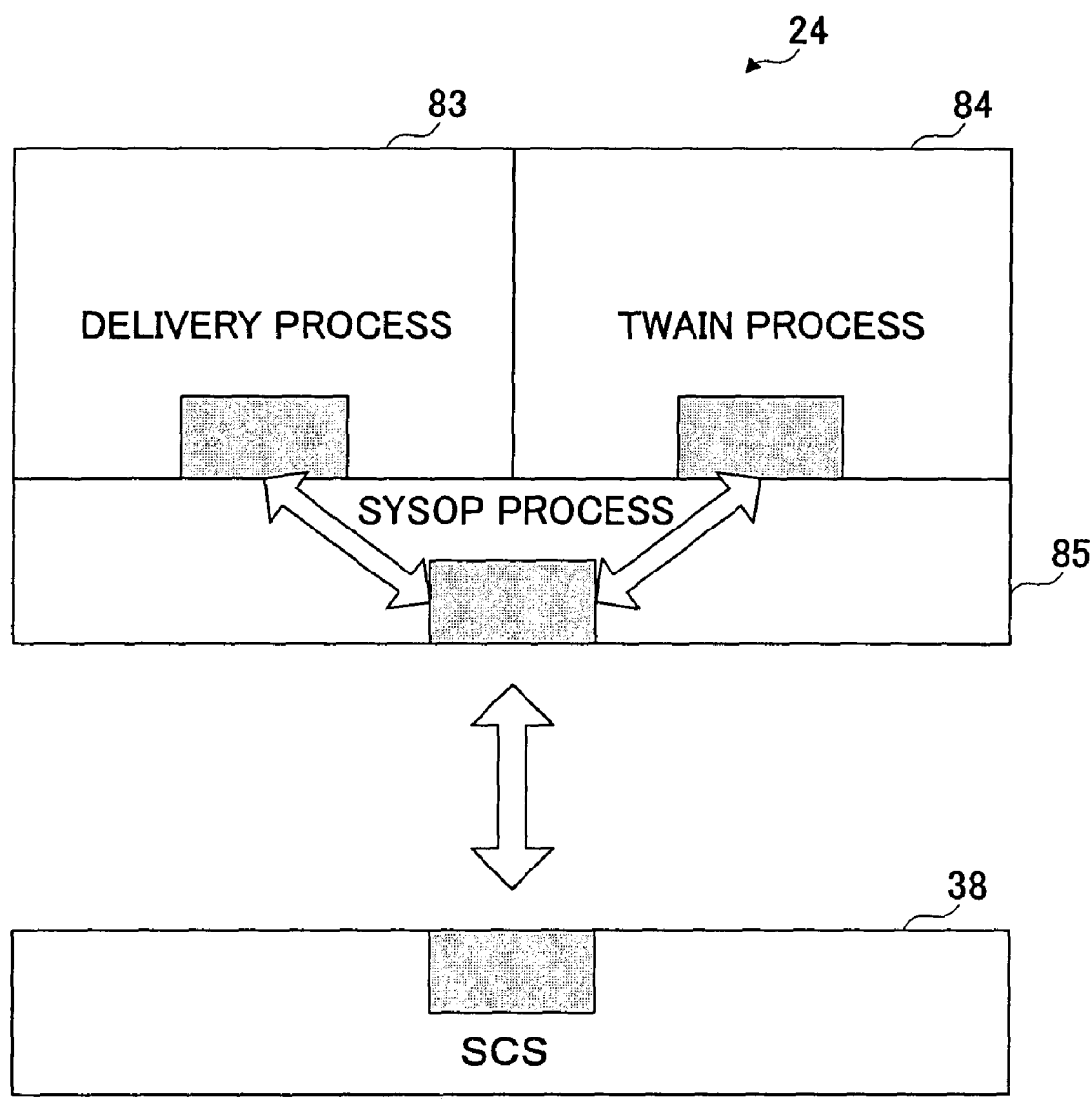
FIG. 20 is an illustrative drawing showing a structure of a scanner application.

In the following, a description will be given of the processing within an application that is performed during the above-described process. The scanner application 24 is taken as an example. FIG. 20 is an illustrative drawing showing a structure of the scanner application 24. This figure shows the SCS 38 and the scanner application 24. A SYSOP process 85, a delivery process 83, and a TWAIN process 84, which are the internal processes of the scanner application 24, are also illustrated.

The SYSOP process 85 attends to exchanges with external processes, and distributes a signal from the external processes to a proper process. The delivery process 83 delivers image data or the like through a network. The TWAIN process 84 attends to processing relating to TWAIN, which is an API for an image scan apparatus.

Figure 21:
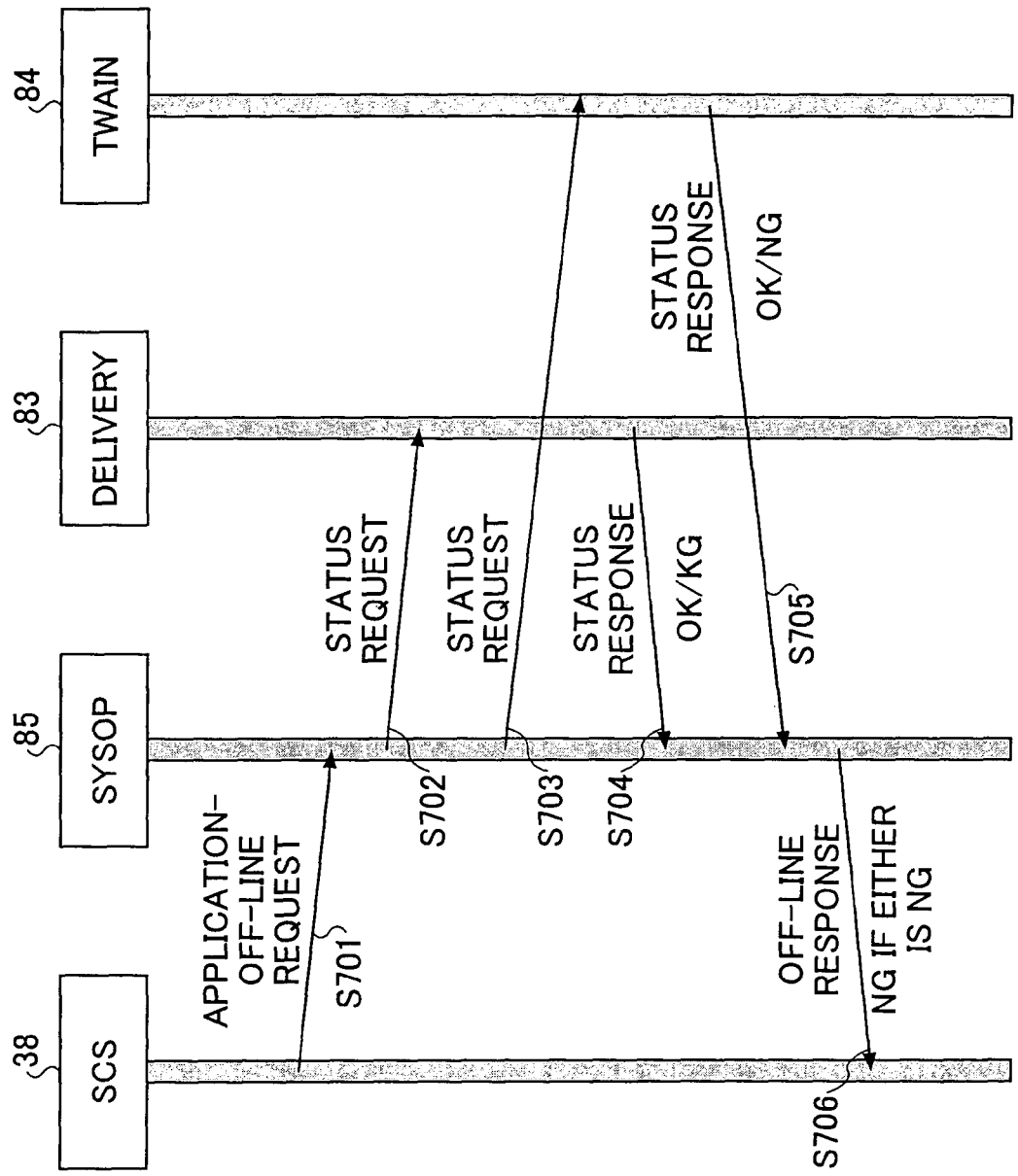
FIG. 21 is a sequence chart showing exchanges between processes.

FIG. 21 is a sequence chart showing exchanges between these processes. The sequence chart of FIG. 21 shows the processing performed inside the scanner application 24 when the scanner application responds to an application-off-line request from the SCS 38 by returning an off-line acknowledgement.

At step S701, the SCS 38 sends an application-off-line request to the SYSOP process 85 of the scanner application 24. Having received the application-off-line request, the SYSOP process 85 sends a status request to the delivery process 83 and the TWAIN process 84 at step S702 and step S703, respectively. Having received the status request, the delivery process 83 and the TWAIN process 84 send a status response indicative of OK or NG to the SYSOP process 85 at step S704 and step S705, respectively.

If both of the status responses from the delivery process 83 and the TWAIN process 84 indicate OK, the SYSOP process 85 responds to these status responses by transmitting an off-line acknowledgement (OK) to the SCS 38 at step S706. If at least one of the status responses from the delivery process 83 and the TWAIN process 84 indicate NG, the SYSOP process 85 sends an off-line negation (NG) to the SCS 38 at step S706.

By the same token, other applications are also configured to send an off-line negation (NG) to the SCS 38 if at least one of the internal processes returns NG.

Figure 22:
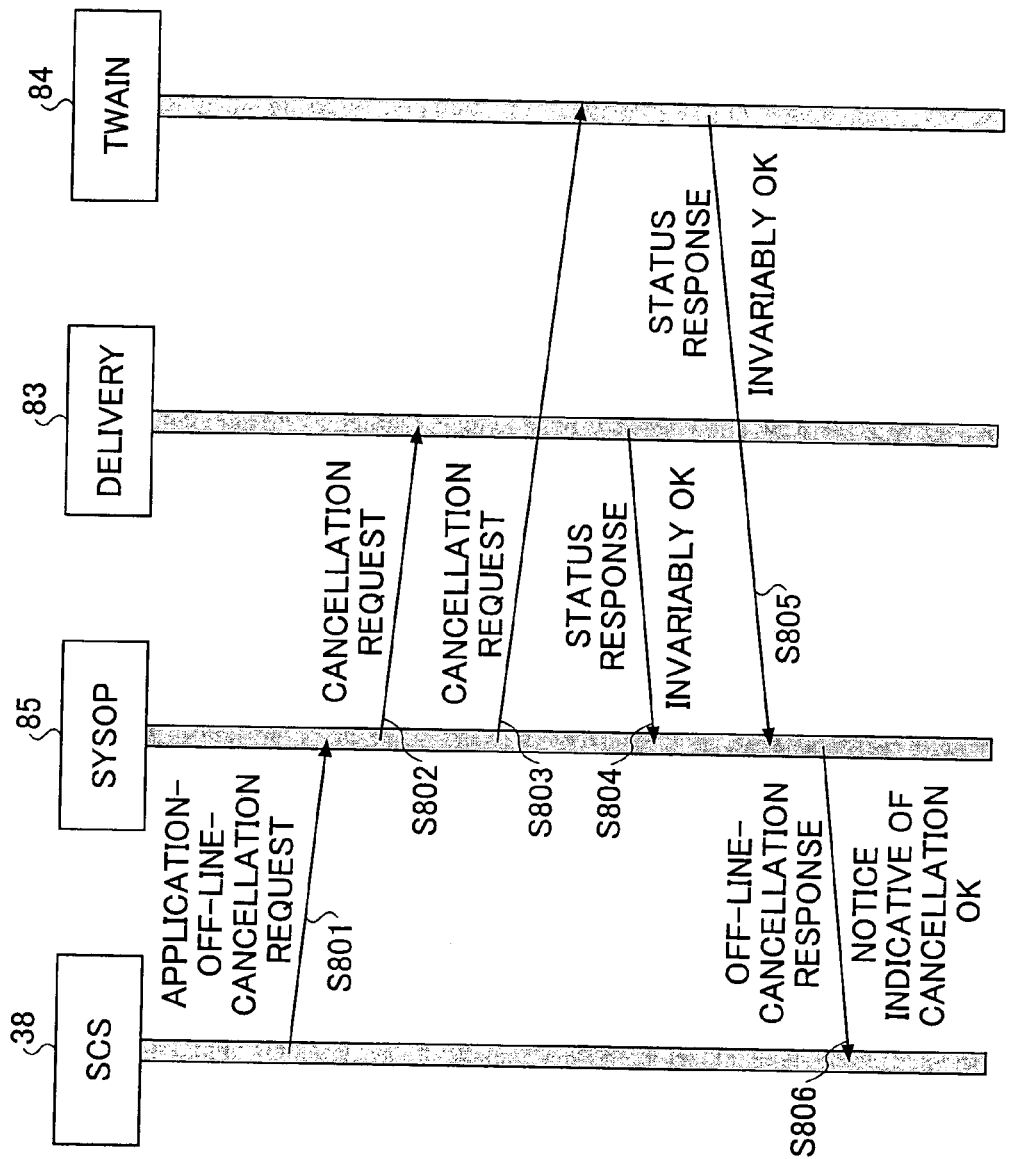
FIG. 22 is a sequence chart showing the cancellation of the off-line state.

FIG. 22 is a sequence chart showing the cancellation of the off-line state. At step S801, the SCS 38 transmits an application-off-line-cancellation request to the SYSOP process 85 of the scanner application 24. In response to the application-off-line-cancellation request, the SYSOP process 85 sends a cancellation request to the delivery process 83 and the TWAIN process 84 at step S802 and step S803, respectively. Having received the cancellation request, the delivery process 83 and the TWAIN process 84 transmit a status response invariably indicating OK to the SYSOP process 85 at step S804 and step S805, respectively.

In response to the status response indicative of OK, the SYSOP process 85 sends an off-line-cancellation acknowledgement (OK) to the SCS 38 at step S806.

Figure 23:
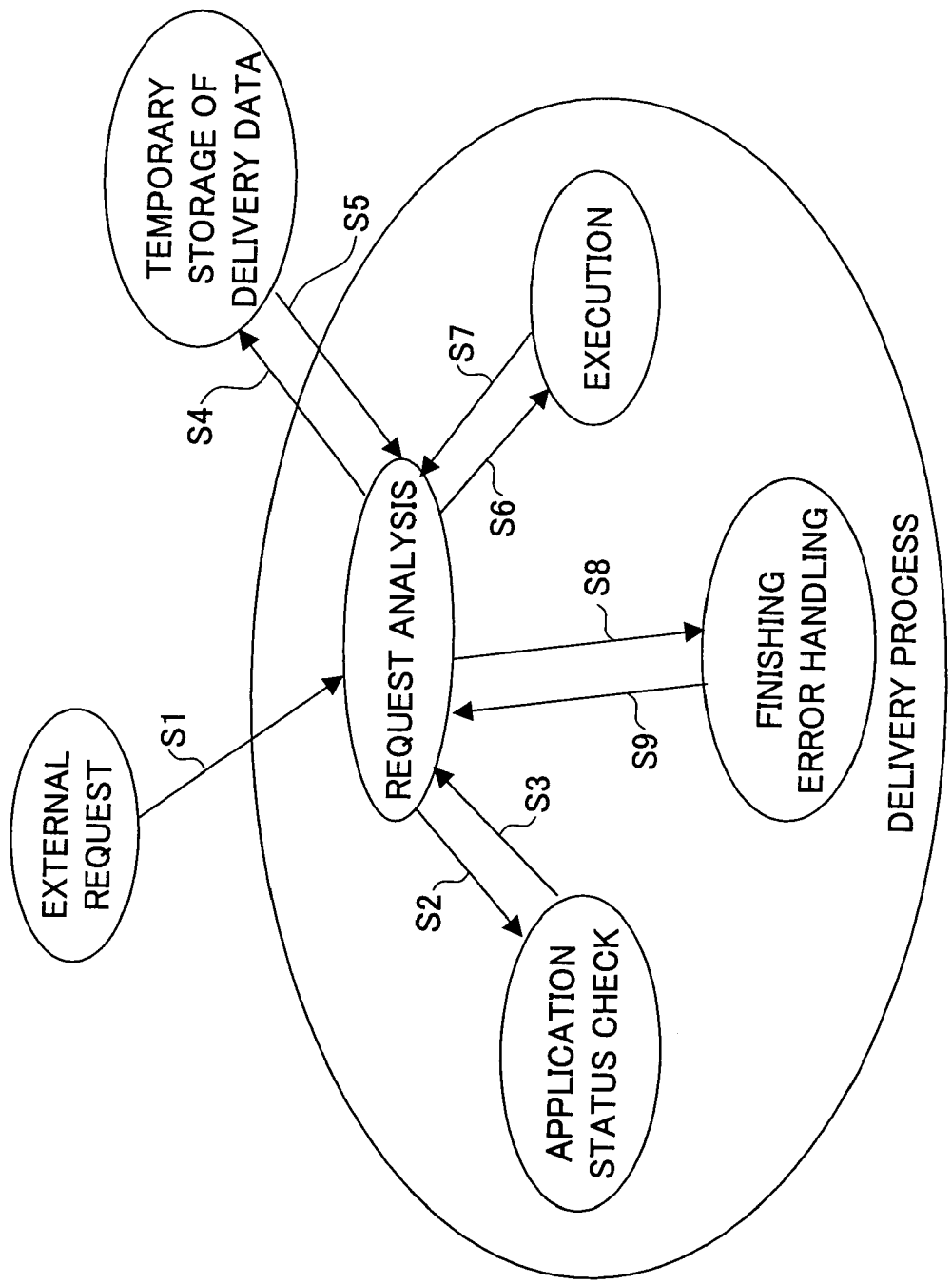
FIG. 23 is an illustrative drawing showing a process performed by the scanner application in response to a delivery request requesting the delivery of image data.

FIG. 23 is an illustrative drawing showing a process performed by the scanner application 24 in response to a delivery request requesting the delivery of image data, for example. FIG. 23 shows the process performed by the scanner application 24, which will be described with reference to assigned sequence numbers. At step S1, the scanner application 24 receives a delivery request from a process outside the scanner application 24. At step S2 and step S3, the scanner application 24 checks its own state by use of request analysis.

If the state is an off-line state, the scanner application 24 temporarily stores delivery data at step S4 and step S5 by use of the request analysis.

If the state is not an off-line state, the state is a normal state, so that the scanner application 24 attends to delivery processing at step S6 and step S7.

At step S8 and step S9, the scanner application 24 attends to termination processing or error processing concerning the handling of a request that cannot be responded in the off-line state. The procedure then comes to an end.

In this manner, an application in the off-line state puts an external request on hold, or attends to error processing if a request is not possible to respond.

In the following, a description will be given of a process performed by an application when the application cannot shift to the off-line state.

Figure 24:
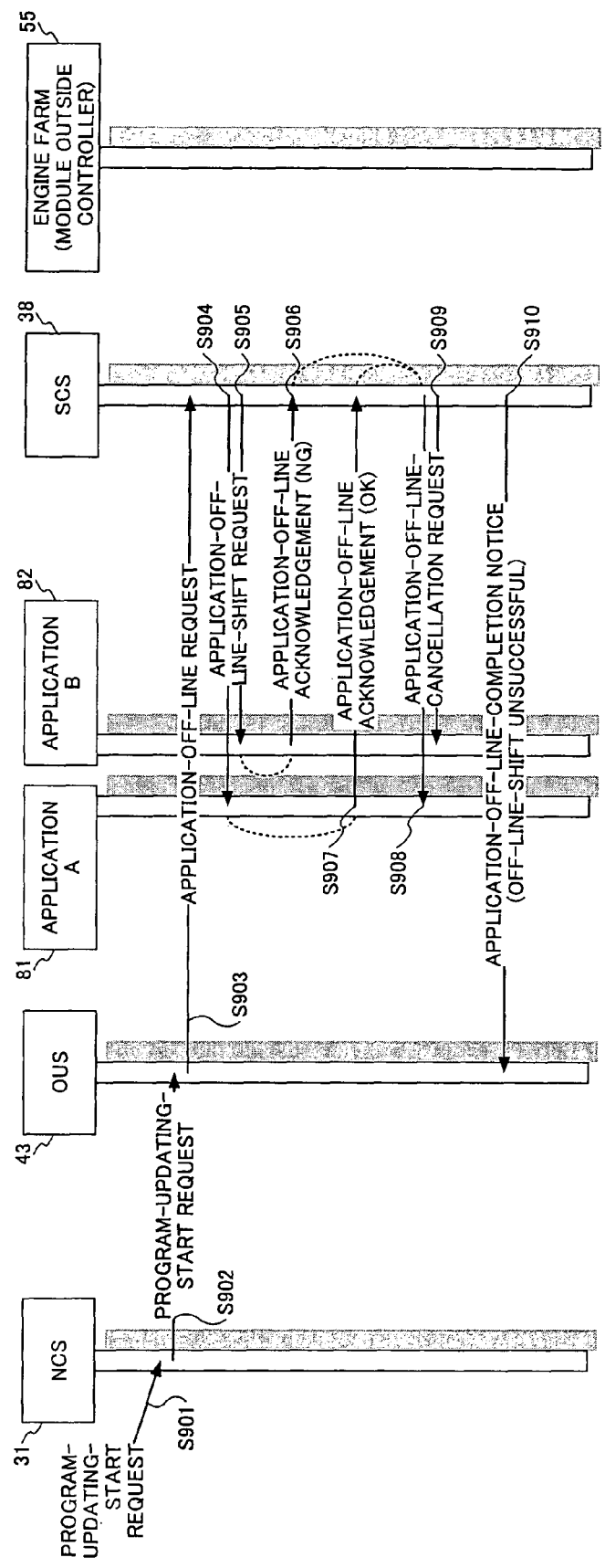
FIG. 24 is a sequence chart showing a process of waiting for responses from all the applications before notifying the OUS that no shift to the off-line state is made, without going ahead to notify the OUS when some but not all of the applications have indicated an inability to shift to the off-line state.

FIG. 24 is a sequence chart showing a process of waiting for responses from all the applications before notifying the OUS 43 that no shift to the off-line state is made, without going ahead to notify the OUS 43 when some but not all of the applications have indicated an inability to shift to the off-line state.

In what follows, a description will be made with reference to the sequence chart. At step S901, the NCS 31 is notified of the start of program updating from the network. At step S902, the NCS 31 sends a notice indicative of the start of program updating to the OUS 43. In response to the notice, the OUS 43 sends an application-off-line request to the SCS 38 at step S903.

Having received the off-line request from the OUS 43, the SCS 38 transmits an application-off-line-shift request to the application A 81 and the application B 82 at step S904 and step S905, respectively.

Having received the application-off-line-shift request, the application B 82 transmits an application-off-line negation (NG) to the SCS 38 at step S906 since it cannot shift to the off-line state. On the other hand, the application A 81 can shift to the off-line state, so that it sends an application-off-line acknowledgement (OK) at step S907.

The SCS 38 then transmits an application-off-line-cancellation request to the application A 81 and the application B 82 at step S908 and step S909, respectively. The SCS 38 sends an application-off-line-completion notice (NG) to the OUS 43 at step S910 to notify that the applications have failed to shift to the off-line state.

In this manner, the SCS 38 waits for responses from all the applications to which an off-line-shift request has been sent, without regard to the fact that some of these applications has already reported an inability to shift to the off-line state. After receiving all of these responses, the SCS 38 notifies the OUS 43 that the applications have not shifted to the off-line state.

Figure 25:
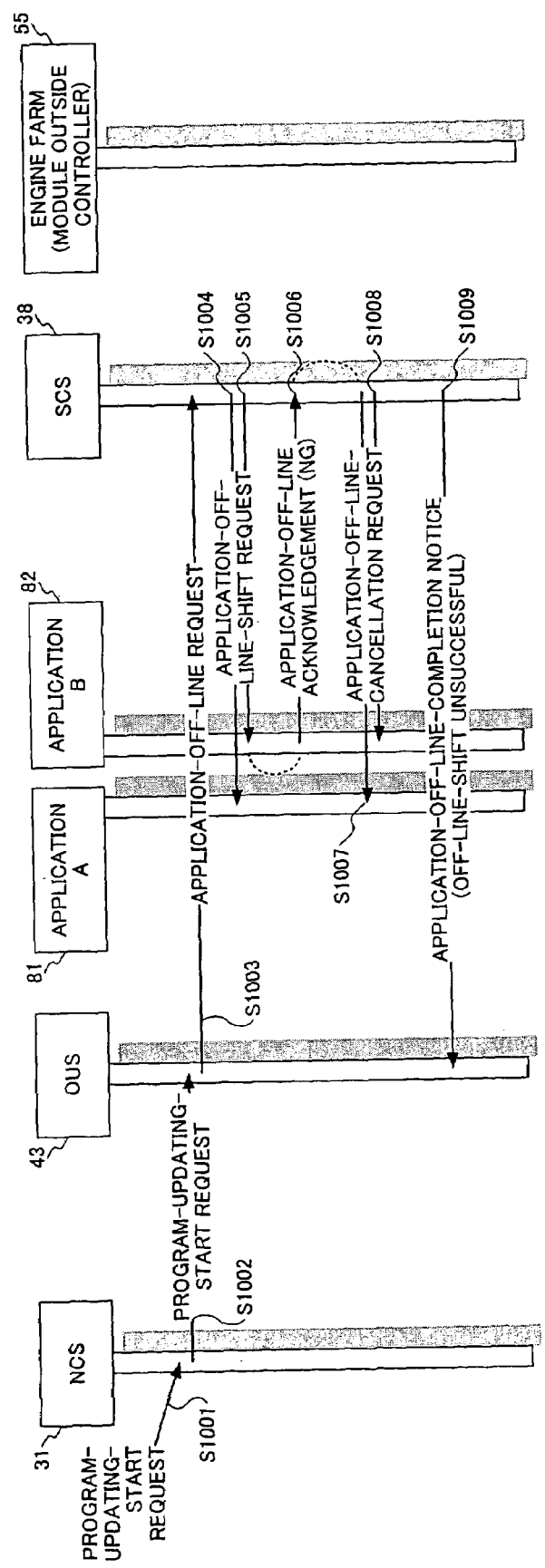
FIG. 25 is a sequence chart showing a process of notifying the OUS of no shift by applications to the off-line state, immediately after receiving a notice from one application indicating an inability to shift to the off-line state.

FIG. 25 is a sequence chart showing a process of notifying the OUS 43 of no shift by applications to the off-line state, immediately after receiving a notice from one application indicating an inability to shift to the off-line state.

At step S1001, the NCS 31 is notified of the start of program updating from the network. At step S1002, the NCS 31 sends a notice indicative of the start of program updating to the OUS 43. In response to the notice, the OUS 43 sends an application-off-line request to the SCS 38 at step S1003.

Having received the off-line request from the OUS 43, the SCS 38 transmits an application-off-line-shift request to the application A 81 and the application B 82 at step S1004 and step S1005, respectively.

Having received the application-off-line-shift request, the application B 82 transmits an application-off-line negation (NG) to the SCS 38 at step S1006 since it cannot shift to the off-line state.

Being notified by the application B 82 that no shift to the off-line state can be made, the SCS 38 then transmits an application-off-line-cancellation request to the application A 81 and the application B 82 at step S1007 and step S1008, respectively.

The SCS 38 then sends an application-off-line-completion notice (NG) to the OUS 43 at step S1009 to notify that the applications have failed to shift to the off-line state.

In this manner, the SCS 38 responds to a notice indicative of an inability to shift to the off-line state sent from one of the applications to which an off-line-shift request has been made. The SCS 38 responds to such a notice by notifying the OUS 43 that the applications have failed to shift to the off-line state, without waiting for responses from the other applications to which the off-line-shift request has been made.

Figure 26:
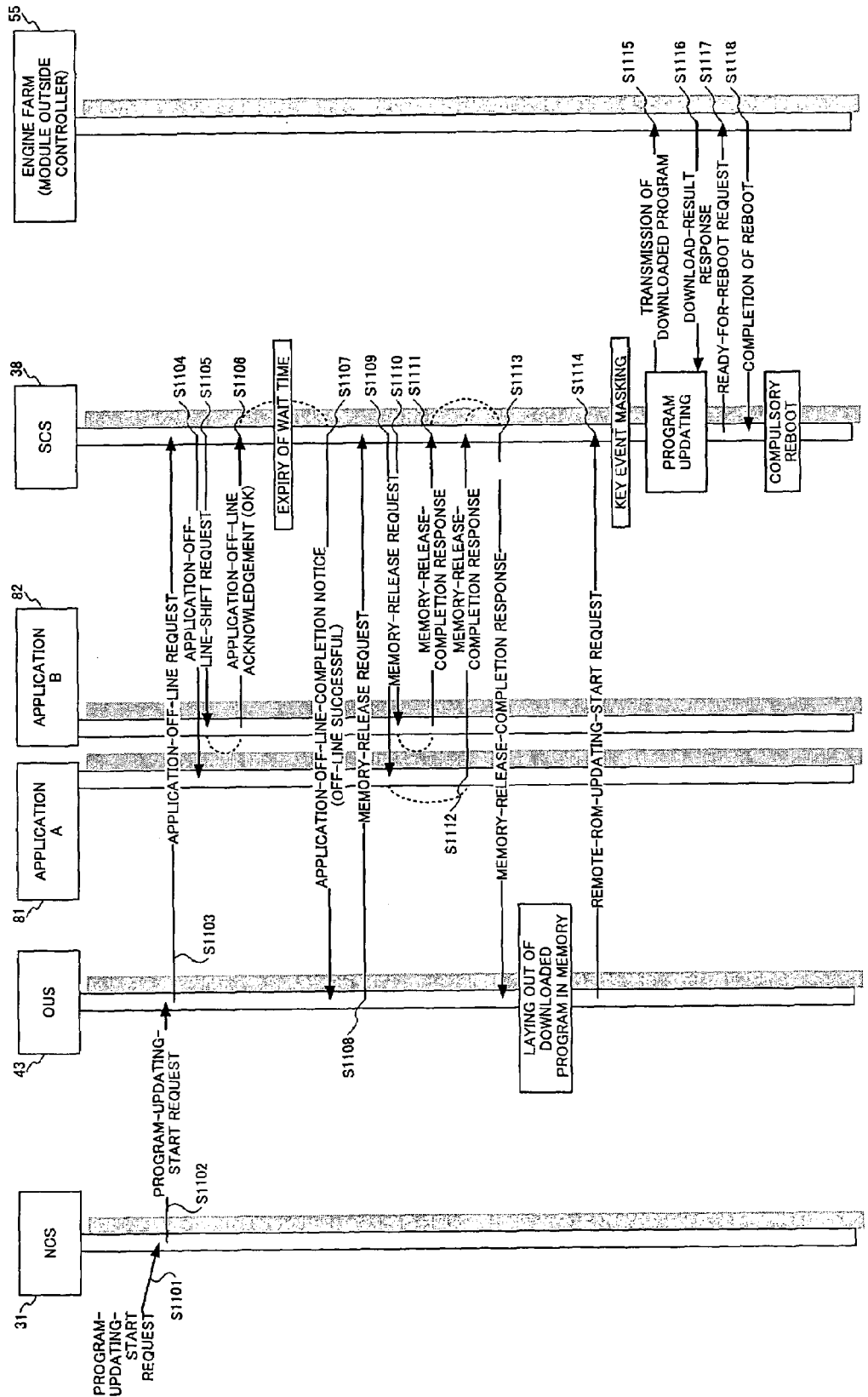
FIG. 26 is a sequence chart showing a process of measuring time after sending an off-line-shift request to applications and notifying the OUS of an application-off-line completion after a predetermined time period passes regardless of whether a response is received.

FIG. 26 is a sequence chart showing a process of measuring time after sending an off-line-shift request to applications and notifying the OUS 43 of an application-off-line completion after a predetermined time period passes regardless of whether a response is received.

At step S1101, the NCS 31 is notified of the start of program updating from the network. At step S1102, the NCS 31 sends a notice indicative of the start of program updating to the OUS 43. In response to the notice, the OUS 43 sends an application-off-line request to the SCS 38 at step S1103.

Having received the off-line request from the OUS 43, the SCS 38 transmits an application-off-line-shift request to the application A 81 and the application B 82 at step S1104 and step S1105, respectively.

Having received the application-off-line-shift request, the application B 82 transmits an application-off-line acknowledgement (OK) to the SCS 38 at step S1106 since it can shift to the off-line state.

After passage of a predetermined time period, the SCS 38 recognizes an expiry of a wait time, and sends an application-off-line-completion notice to the OUS 43 at step S1107 without waiting for a response from the application A 81.

Having received the application-off-line-completion notice, the OUS 43 sends a memory-release request to the SCS 38 at step S1108. This arranges for the application having shifted to the off-line state to release its varying area.

In response to the memory-release request, the SCS 38 transmits a memory-release request to the application A 81 and the application B 82 at step S1109 and step S1110, respectively. The application A 81 and the application B 82 respond to the memory-release requests by releasing respective memory areas. A memory-release-completion response is then sent to the SCS 38 at step S1111 and step S1112.

In response to the memory-release-completion response, the SCS 38 transmits a memory-release-completion response to the OUS 43 at step S1113 to notify that the memory areas have been successfully freed.

In response to the memory-release-completion response, the OUS 43 downloads an updating program. The OUS 43 then lays out the updating program in the memory areas, which are obtained by the releasing of memory areas.

Then, the OUS 43 transmits a remote-ROM-updating-start request to the SCS 38 at step S1114. Having received the remote-ROM-updating-start request, the SCS 38 masks key events.

In order to perform program updating, the SCS 38 transmits the downloaded updating program to the engine farm 55 at step S1115. The engine farm 55 updates a program, and notifies the results of program updating to the SCS 38 at step S1116.

When the results of updating a program are reported, the SCS 38 sends a ready-for-reboot request to the engine farm 55 at step S1117. At step S1118, the SCS 38 carries out a compulsory reboot to terminate the program updating in response to a notice from the engine farm 55 indicating the completion of reboot preparation.

In this manner, the SCS 38 sends an off-line-shift request to applications, and measures time. If no response to the off-line-shift request is received from an application, and a predetermined time period passes without such a response, then, the SCS 38 notifies the OUS 43 that the applications have shifted to the off-line state.

Figure 27:
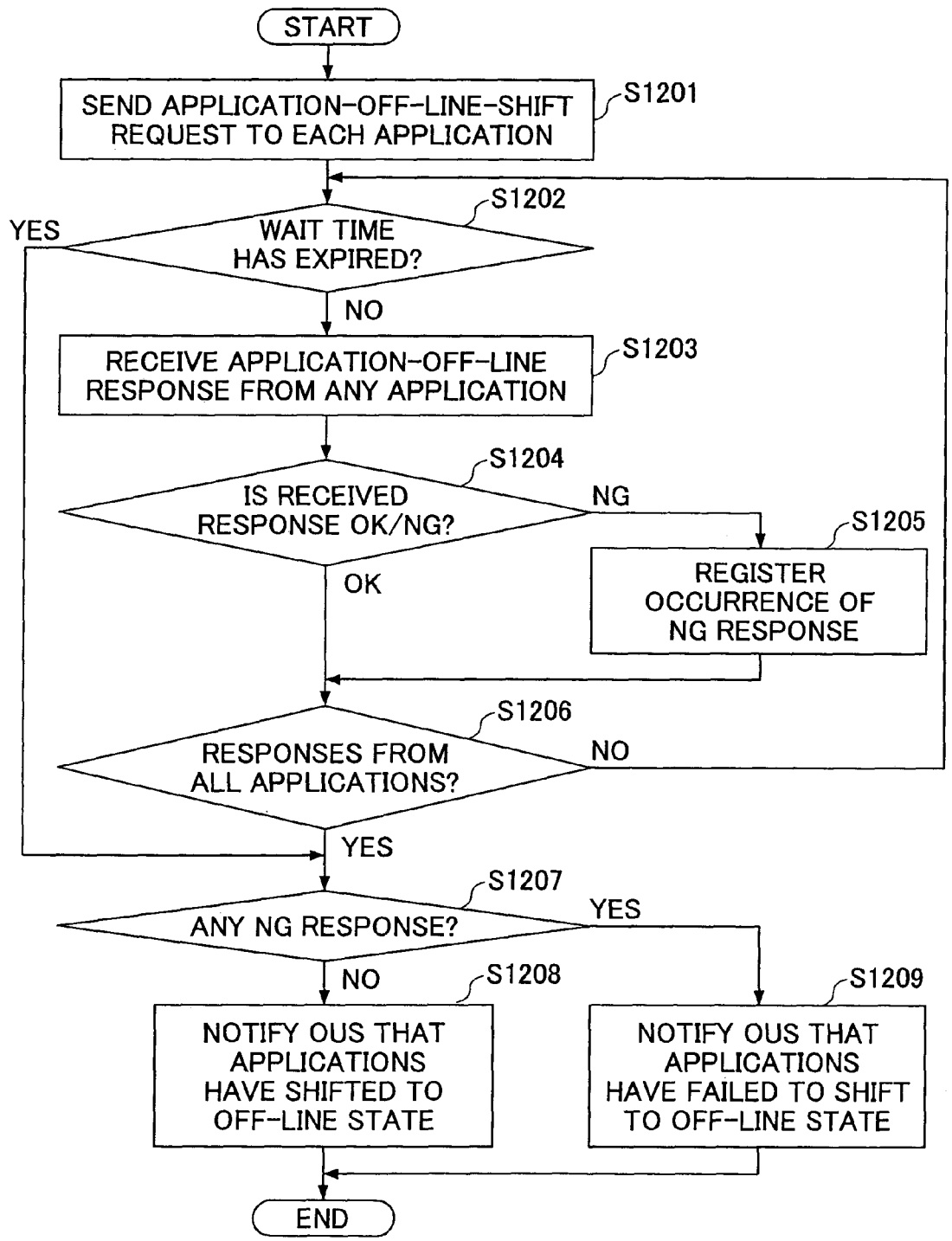
FIG. 27 is a flowchart showing a process of recognizing an expiry of a wait time and a process performed by the SCS which notifies the OUS after waiting for all responses from applications.

FIG. 27 is a flowchart showing a process of recognizing an expiry of a wait time and a process performed by the SCS 38 which notifies the OUS 43 after waiting for all responses from applications.

At step S1201, the SCS 38 transmits an application-off-line-shift request to each application. The SCS 38 then checks at step S1202 whether a wait time has expired.

If the wait time has expired, the procedure goes to step S1207, which will be described later. If the wait time has not expired, processing by the SCS 38 moves to step S1203. Receiving an application-off-line response from an application at step S1203, the SCS 38 checks the contents of the application-off-line response at step S1204.

If the response is an application-off-line response (NG), the SCS 38 registers the occurrence of the application-off-line response (NG). Then, the procedure goes to step S1206.

If the response is an application-off-line response (OK), the SCS 38 moves to step S1206.

At step S1206, the SCS 38 checks whether application-off-line responses are received from all the applications. If the SCS 38 has not received application-off-line responses from all the applications, the SCS 38 goes back to step S1202.

If the SCS 38 has received application-off-line responses from all the applications, the SCS 38 performs a process of step S1202.

At step S1207, the SCS 38 checks whether an application-off-line response (NG) has ever been received. If an application-off-line response (NG) has never been received, the SCS 38 notifies the OUS 43 at step S1208 that the applications have shifted to the off-line state. The procedure then comes to an end.

If an application-off-line response (NG) has been received, the SCS 38 notifies the OUS 43 at step S1209 that the applications have failed to shift to the off-line state. The procedure then comes to an end.

Figure 28:
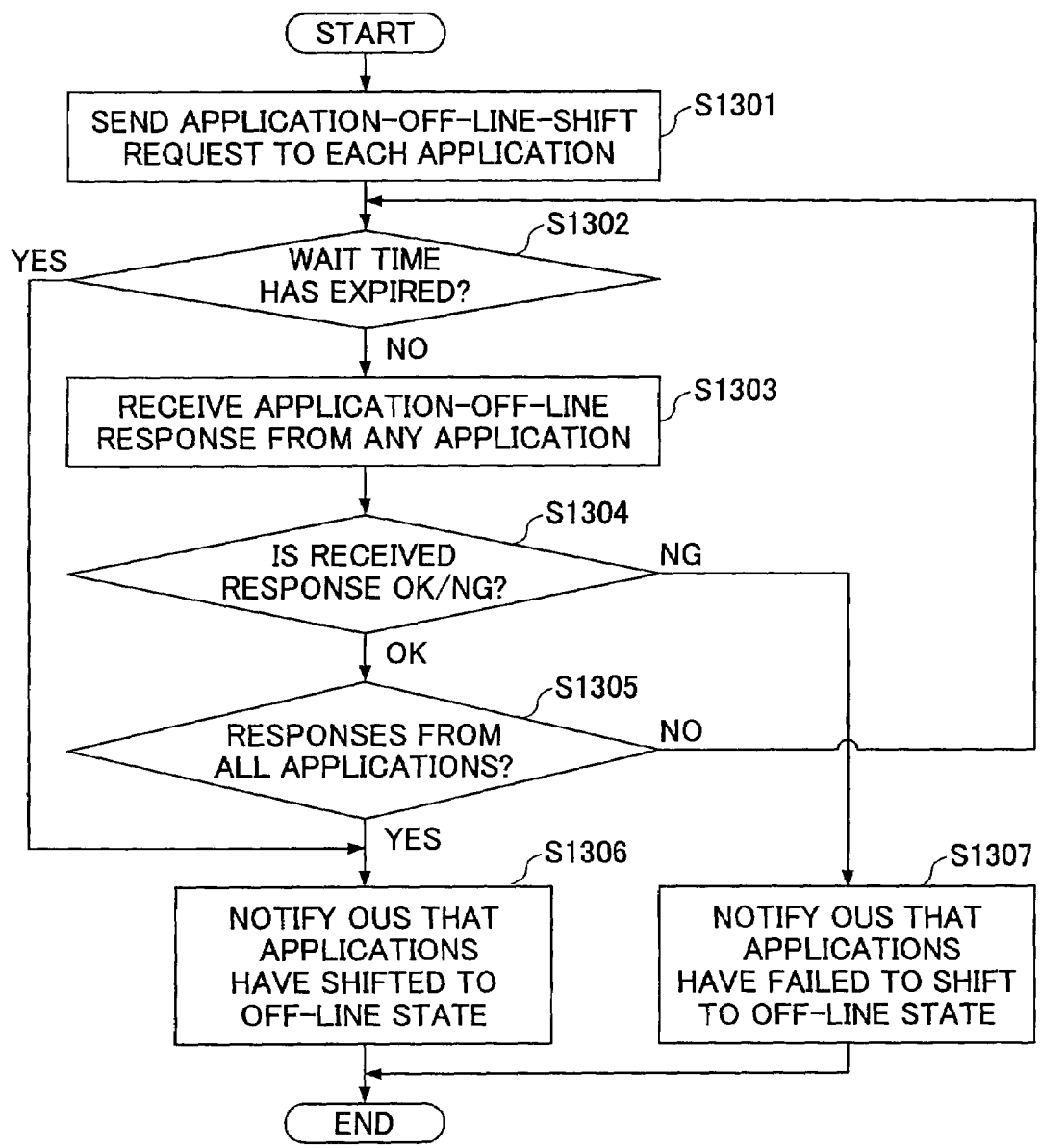
FIG. 28 is a flowchart showing a process performed upon the expiry of a wait time and a process performed by the SCS that immediately notifies the OUS when one of the applications reports its inability to shift to the off-line state.

FIG. 28 is a flowchart showing a process performed upon the expiry of a wait time and a process performed by the SCS 38 that immediately notifies the OUS 43 when one of the applications reports its inability to shift to the off-line state.

At step S1301, the SCS 38 transmits an application-off-line-shift request to applications. The SCS 38 then checks at step S1302 whether a wait time has expired.

If the wait time has expired, the procedure goes to step S1306, which will be described later. If the wait time has not expired, processing by the SCS 38 moves to step S1303. Receiving an application-off-line response from an application at step S1303, the SCS 38 checks the contents of the application-off-line response at step S1304.

If the response is an application-off-line response (NG), the SCS 38 immediately notifies the OUS 43 at step S1307 that the applications have failed to shift to the off-line state. Then, the procedure comes to an end.

If the response is an application-off-line response (OK), the SCS 38 moves to step S1305.

At step S1305, the SCS 38 checks whether off-line responses are received from all the applications. If the SCS 38 has not received off-line responses from all the applications, the SCS 38 goes back to step S1302.

If the SCS 38 has received off-line responses from all the applications, the SCS 38 notifies the OUS 43 at step S1306 that the applications have shifted to the off-line state. With this, the procedure comes to an end.

In the following, a description will be given of a process performed by the IMH 41 that releases a varying area used by an application.

Figure 29:
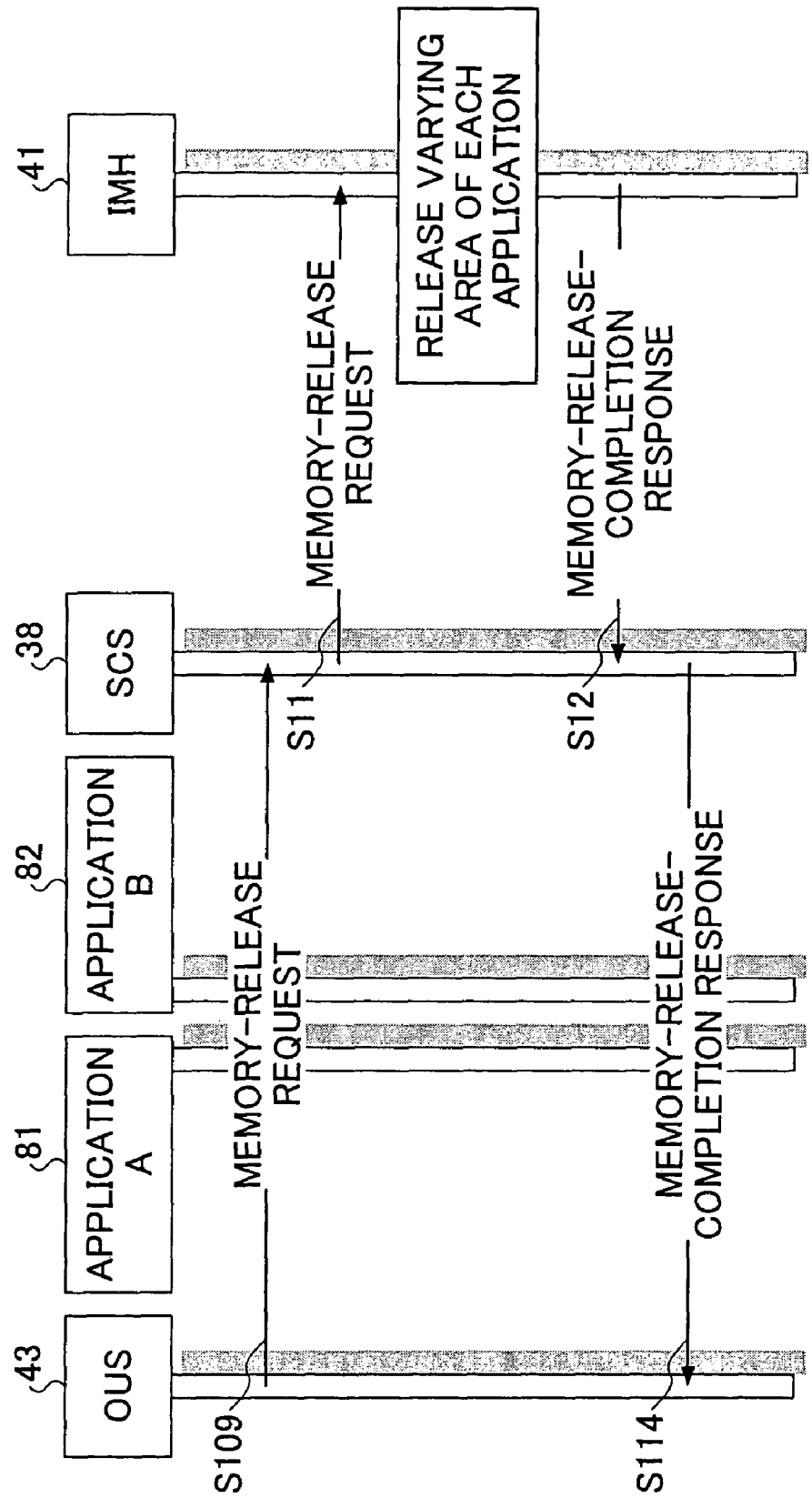
FIG. 29 is a sequence diagram showing a process performed by an IMH that releases a varying area used by an application.

FIG. 29 is a sequence diagram showing a process performed by the IMH 41 that releases a varying area used by an application.

The sequence chart of FIG. 29 illustrates changes made in step S109 through step S114 from the sequence chart of FIG. 14 as necessitated by the introduction of the IMH 41.

At step S109 of FIG. 29, the OUS 43 sends a memory-release request to the SCS 38 in the same manner provided in FIG. 14. Unlike FIG. 14, the SCS 38 responds to the memory-release request by transmitting a memory-release request to the IMH 41 at step S11. Having received the memory-release request, the IMH 41 releases a varying area of each application, and notifies the SCS 38 at step S12 of the completion of memory releases. Similar to FIG. 14, the SCS 38 responds to the notice of memory-release completion by sending a memory-release-completion response to the IMH 41.

Figure 30:
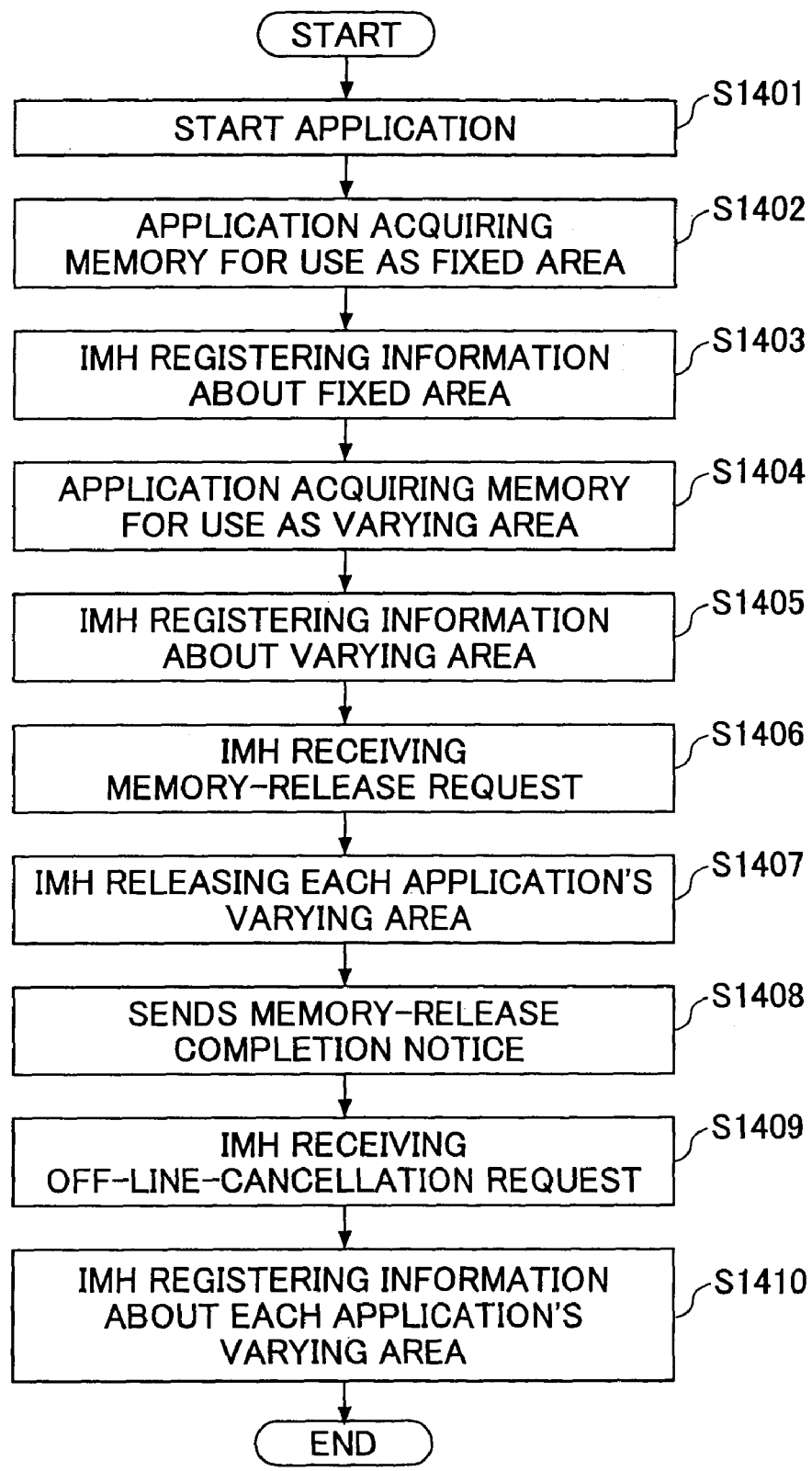
FIG. 30 is a flowchart showing a process performed by the IMH.

FIG. 30 is a flowchart showing a process performed by the IMH 41.

Applications start running at step S1401. At step S1402, applications acquire memory areas for use as fixed areas. At step S1403, the IMH 41 registers information about the fixed areas as memory-area information.

At step S1404, the applications acquire memory areas for use as varying areas. At step S1405, the IMH 41 registers information about the varying areas as memory area information.

The memory area information indicative of the varying areas and the fixed areas are structured as shown in FIG. 31. In FIG. 31, the memory area information about the fixed area of the application A includes a fixed area start address 0x100000, a fixed area end address 0x1FFFFF, a varying area head address 0x200000, and a varying area end address 0x24FFFF. The same applies in the case of other applications. The addresses described above are represented in hexadecimal. When a fixed area and a varying area are contiguous, there is no need to indicate the varying area end address. Furthermore, if areas assigned to respective applications are contiguous, the fixed area end addresses are not necessary.

In this manner, the IMH 41 registers memory area information, thereby being able to release memory areas used by applications by referring to the registered memory area information.

With reference to the flowchart again, at step S1406, the IMH 41 receives the memory-release request from the SCS 38. At step S1407, the IMH 41 releases the varying area of each application. At step S1408, the IMH 41 sends a memory-release completion notice to the SCS 38.

With the varying area being released, the IMH 41 receives an off-line-cancellation request from the SCS 38 at step S1409. The IMH 41 then registers information about the varying area of each application again at step S1410.

The foregoing is a description of a process that releasing a varying area by putting a process in the off-line state. In the following, the termination of a process will be described.

Figure 32:
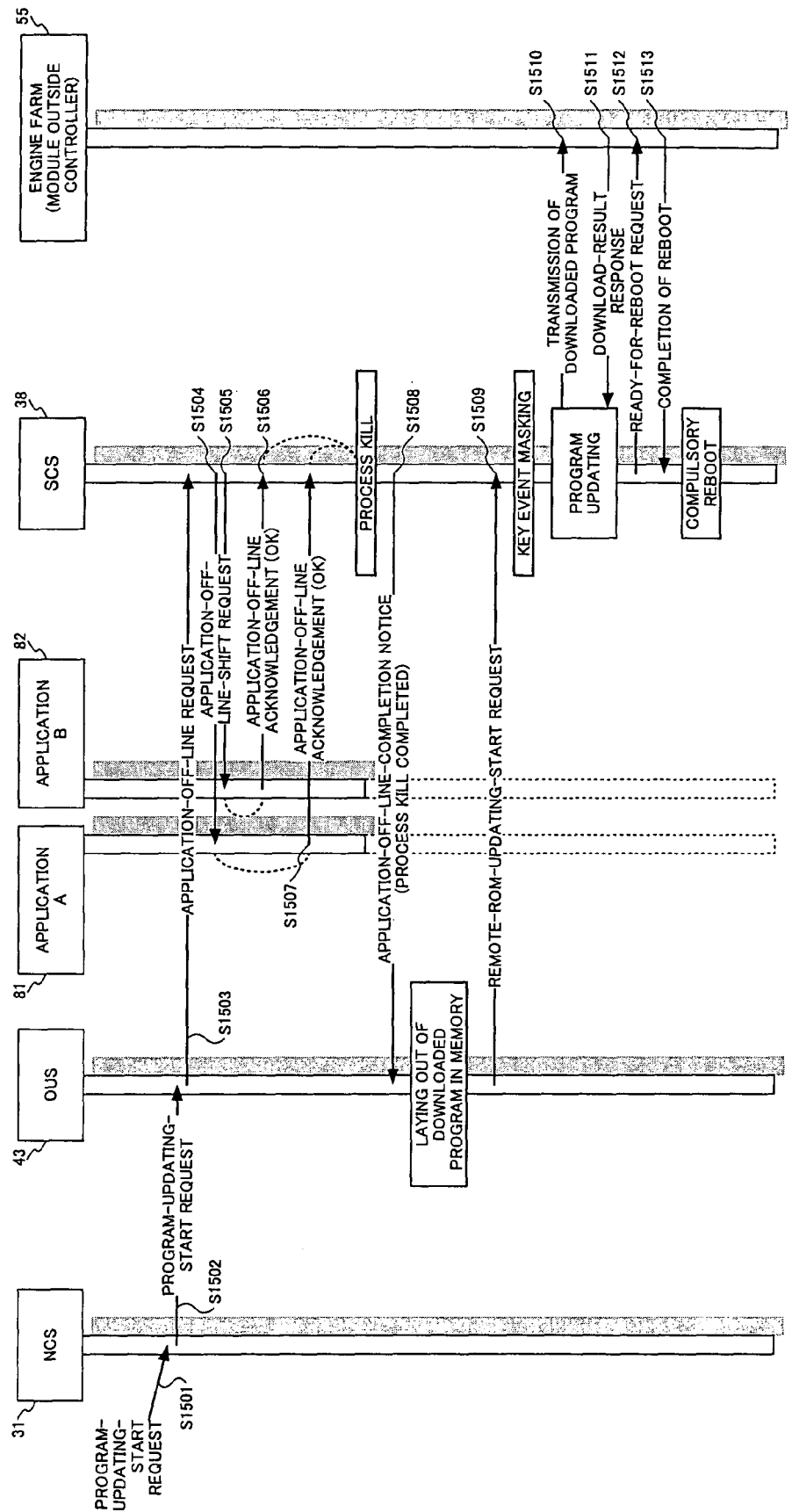
FIG. 32 is a sequence chart showing a process performed by multifunction peripheral that terminates two applications and downloads an updating program, followed by updating a program stored in the flash memory.

FIG. 32 is a sequence chart showing a process performed by multifunction peripheral 1 that terminates two applications (the application A 81 and the application B 82) and downloads an updating program, followed by updating a program stored in the flash memory 69.

In what follows, the sequence chart will be described. At step S1501, the NCS 31 receives a program-updating-start notice from the network. At step S1502, the NCS 31 sends the program-updating-start notice to the OUS 43. Having received the program-updating-start notice, the OUS 43 sends an application-off-line request to the SCS 38 at step S1503. The off-line request shown in this sequence chart includes a request for terminating an application after putting a process in the off-line state.

Having received the application-off-line request from the OUS, the SCS 38 sends an application-off-line-shift request to the application A 81 and the application B 82 at step S1504 and step S1505, respectively. In response to the application-off-line-shift request, the application A 81 and the application B 82 send an application-off-line acknowledgement (OK) to the SCS 38 if a shift to the off-line state is possible. In the case of this sequence chart, the application A 81 and the application B 82 can shift to the off-line state. Thus, the application A 81 and the application B 82 transmit an application-off-line acknowledgement (OK) to the SCS 38 at step S1506 and step S1507, respectively.

The SCS 38 responds to the application-off-line acknowledgement (OK) by terminating the application A 81 and the application B 82. This corresponds to a process terminating step. After terminating the applications, the SCS 38 sends an application-off-line-completion notice to the OUS 43 at step S1508 to indicate that the termination of the applications is successfully completed (process KILL completion). The OUS 43 responds to the application-off-line-completion notice by downloading an updating program, and lays out the updating program in the memory area obtained by the termination of the applications.

Then, the OUS 43 sends a remote-ROM-updating-start request to the SCS 38 at step S1509 to request the start of program updating. In response to the remote-ROM-updating-start request, the SCS 38 masks key events.

Thereafter, the SCS 38 transmits the downloaded updating program to the engine farm 55 at step S1510 in order to update a program. The engine farm 55 updates a program and notifies the SCS 38 of the updating results at step S1511.

When the results of updating a program are reported, the SCS 38 sends a ready-for-reboot request to the engine farm 55 at step S1512. At step S1513, the SCS 38 carries out a compulsory reboot to terminate the program updating in response to a notice from the engine farm 55 indicating the completion of reboot preparation.

In this manner, the SCS 38 releases a memory area allocated to a process, and the OUS 43 downloads an updating program for updating a program by use of the NCS 31, followed by the SCS 38 laying out the updating program in the released memory area.

In the following, a description will be given of a process performed by the OUS 43 and the SCS 38 with reference to a flowchart.

Figure 33:
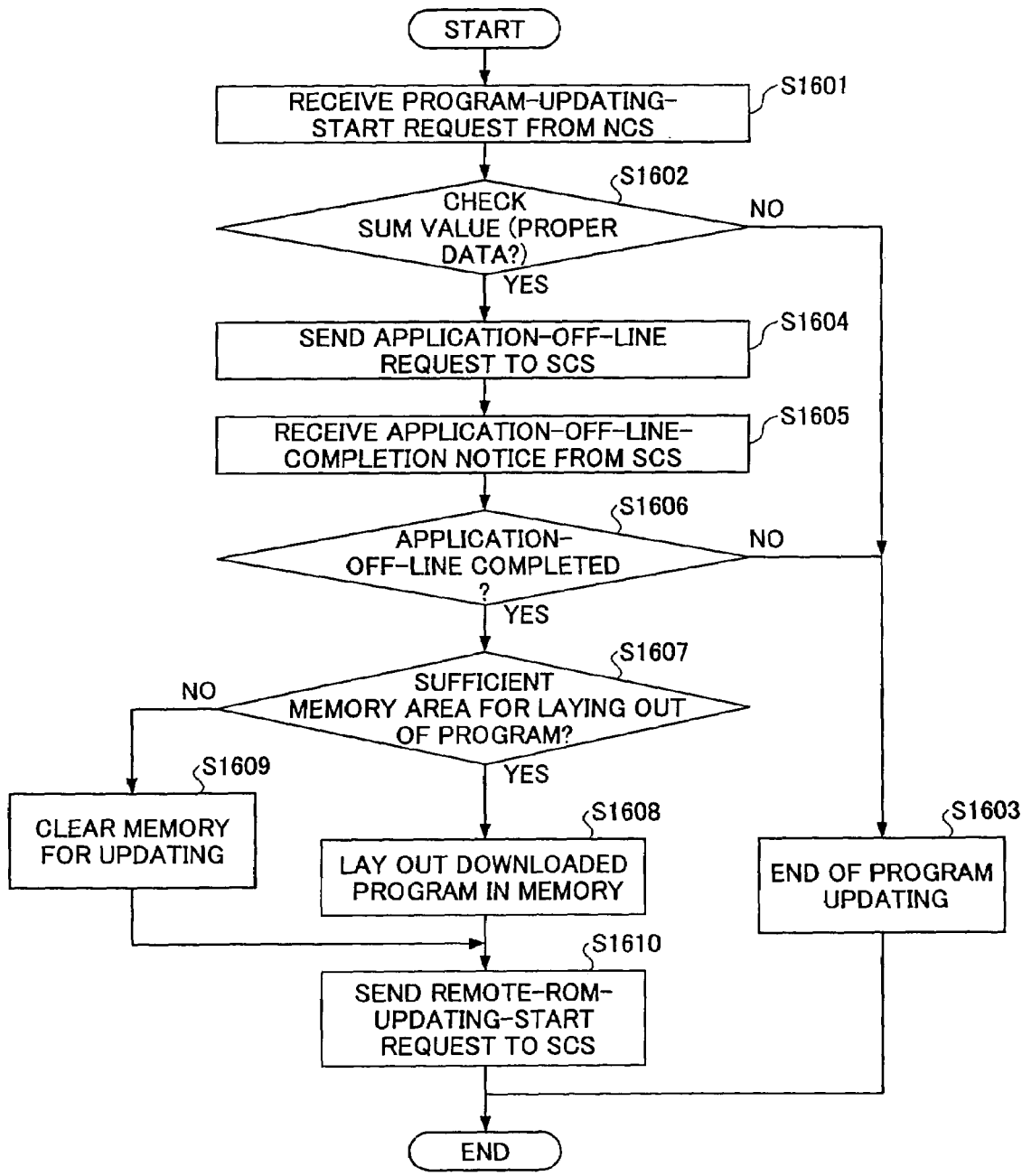
FIG. 33 is a flowchart of a process performed by the OUS.

FIG. 33 is a flowchart of a process performed by the OUS 43. At step S1601, the OUS 43 receives a notice indicative of the start of program updating from the NCS 31. At step S1602, the OUS 43 checks a SUM value in order to determine whether the received notice indicative of the start of program updating is proper data. If the notice indicative of the start of program updating is not proper data, the program updating comes to an end at step S1603.

If it is determined at step S1604 that the notice indicative of the start of program updating is proper data, the OUS 43 transmits an application-off-line request to the SCS 38 at step S1604 to put an application in the off-line state and to terminate the application. Receiving an application-off-line-completion notice at step S1605 as a response to the application-off-line request, the OUS43 checks at step S1606 whether the application off-line processing is completed. The process of step S1606 is necessary in order to put an end to the program updating at step S1603 when it is notified that the application-off-line processing is not completed.

If step S1606 finds that the application-off-line processing is completed, the OUS 43 checks at step S1607 whether it is possible to lay out an updating program in the memory area secured by the termination of the applications.

If it is not possible to lay out the updating program, the OUS 43 clears the secured memory area at step S1609. The term "clear" is used to indicate the setting of a memory area in such a state as program updating is not performed. At step S1610, the OUS 43 sends a remote-ROM-updating-start request to the SCS 38 to request the start of program updating. The procedure then comes to an end. In this case, the memory areas are set in such a condition as not to allow program updating. Program updating is thus not to be performed.

If step S1607 finds that it is possible to lay out the updating program, the OUS 43 lays out the updating program in the memory area at step S1608. At step S1610, the OUS 43 sends a remote-ROM-updating-start request to the SCS 38 to request the start of program updating. The procedure then comes to an end.

Figure 34:
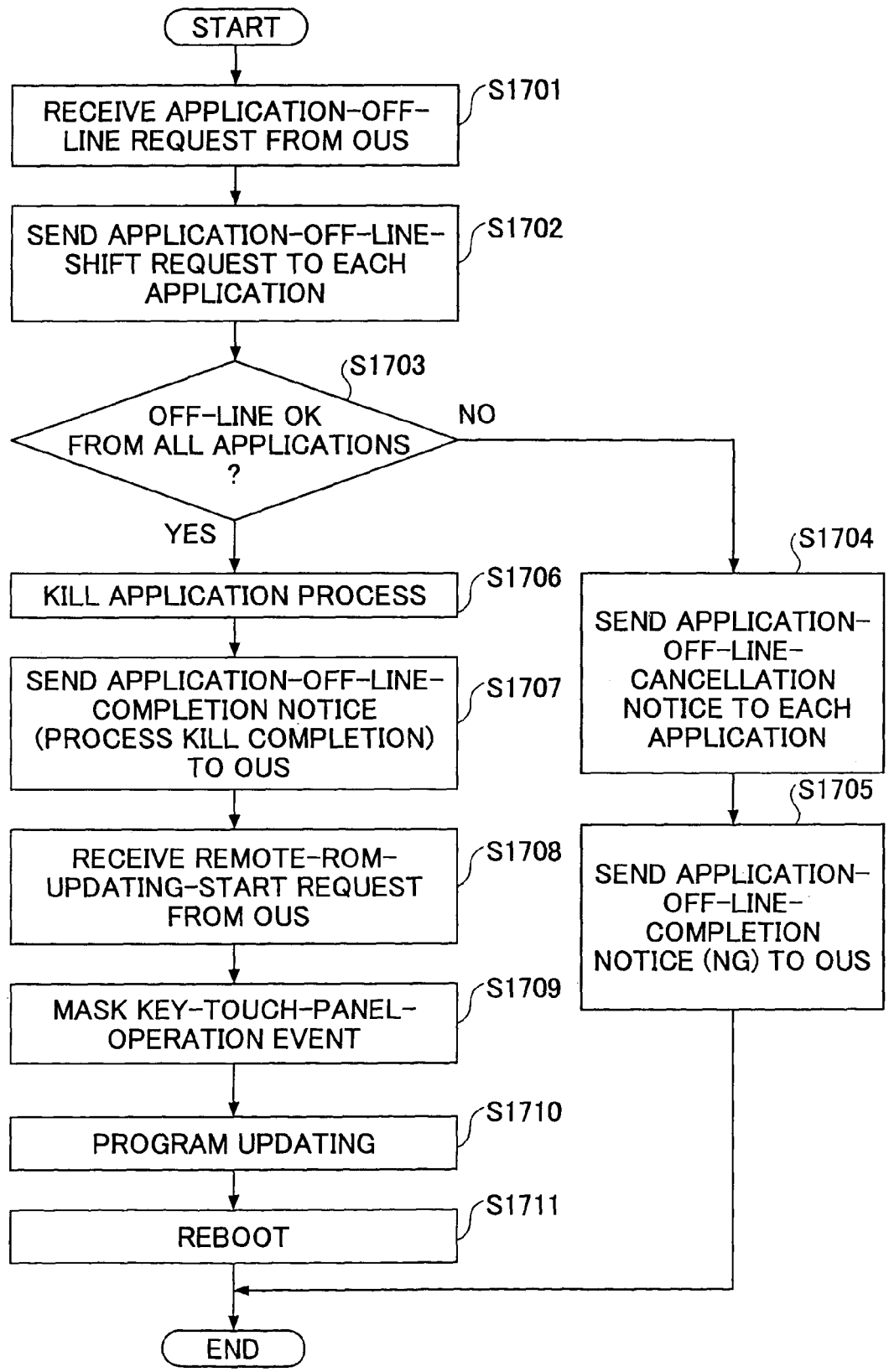
FIG. 34 is a flowchart of a process performed by the SCS.

FIG. 34 is a flowchart of a process performed by the SCS 38. At step S1701, the SCS 38 receives an application-off-line request from the OUS 43. In response to the application-off-line request, the SCS 38 transmits an application-off-line-shift request to each application at step S1702.

At step S1703, the SCS 38 checks whether an application-off-line acknowledgement (OK) is received from all the application. If it is not the case, the SCS 38 sends an application-off-line-cancellation notice to each application at step S304. As a result, the applications are allowed to perform formerly restricted processing. At step S1705, the SCS 38 notifies the OUS 43 that the applications did not shift to the off-line state. The procedure then comes to an end.

If it is found at step S1703 that all the applications send an application-off-line acknowledgement (OK), the SCS 38 terminates the applications at step S1706. At step S1707, the SCS 38 transmits an application-off-line-completion notice to the OUS 43.

At step S1708, the SCS 38 receives a remote-ROM-updating-start request from the OUS 43 requesting the start of program updating. At step S1709, the SCS 38 masks events concerning key-touch-panel operations on the operation panel 52, thereby masking key events.

In this manner, the operation panel 52 is invalidated when updating a program, thereby insuring that the updating process is carried out at high speed. Further, since unrestricted functions can still be performed, vital functions or the like may be carried out even when a program is being updated.

The SCS 38 performs program updating at step S1710, and carries out a reboot process at step S1711 to restart the multifunction peripheral 1. With this, the procedure comes to an end.

Figure 35:
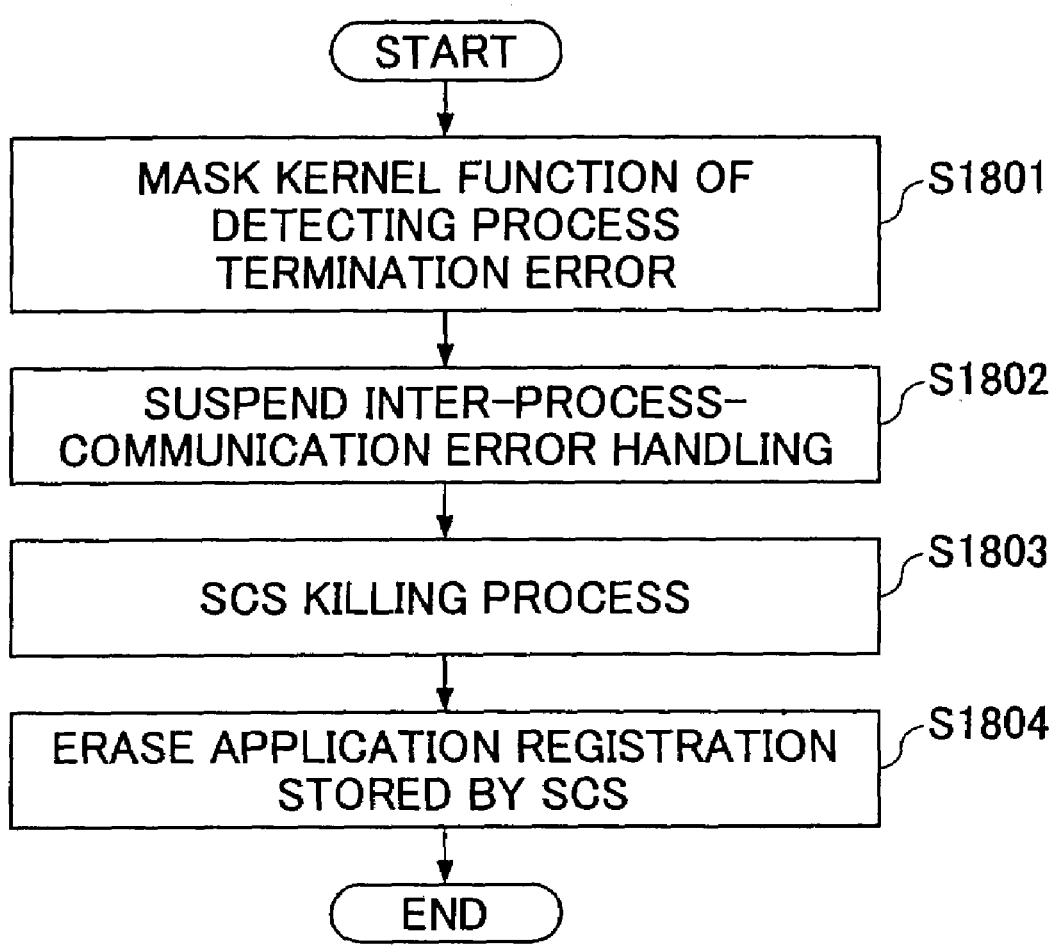
FIG. 35 is a flowchart of the processing that terminates a process.

FIG. 35 is a flowchart of the processing performed at step S1706 described above that terminates a process. At step S1801, the SCS 38 masks the function of detecting a process termination error, which is provided in the kernel (core) of the OS. The SCS 38 suspends inter-process-communication error handling at step S1802. At step S1803, the SCS 38 terminates an application process. At step S1804, the SCS 38 deletes registered information about the application, which is stored by the SCS 38. Then, the procedure comes to an end.

In the following, a description will be given of a process of terminating an application according to the size of an updating program that is downloaded by the OUS 43, with reference to a sequence chart and a flowchart.

Figure 36:
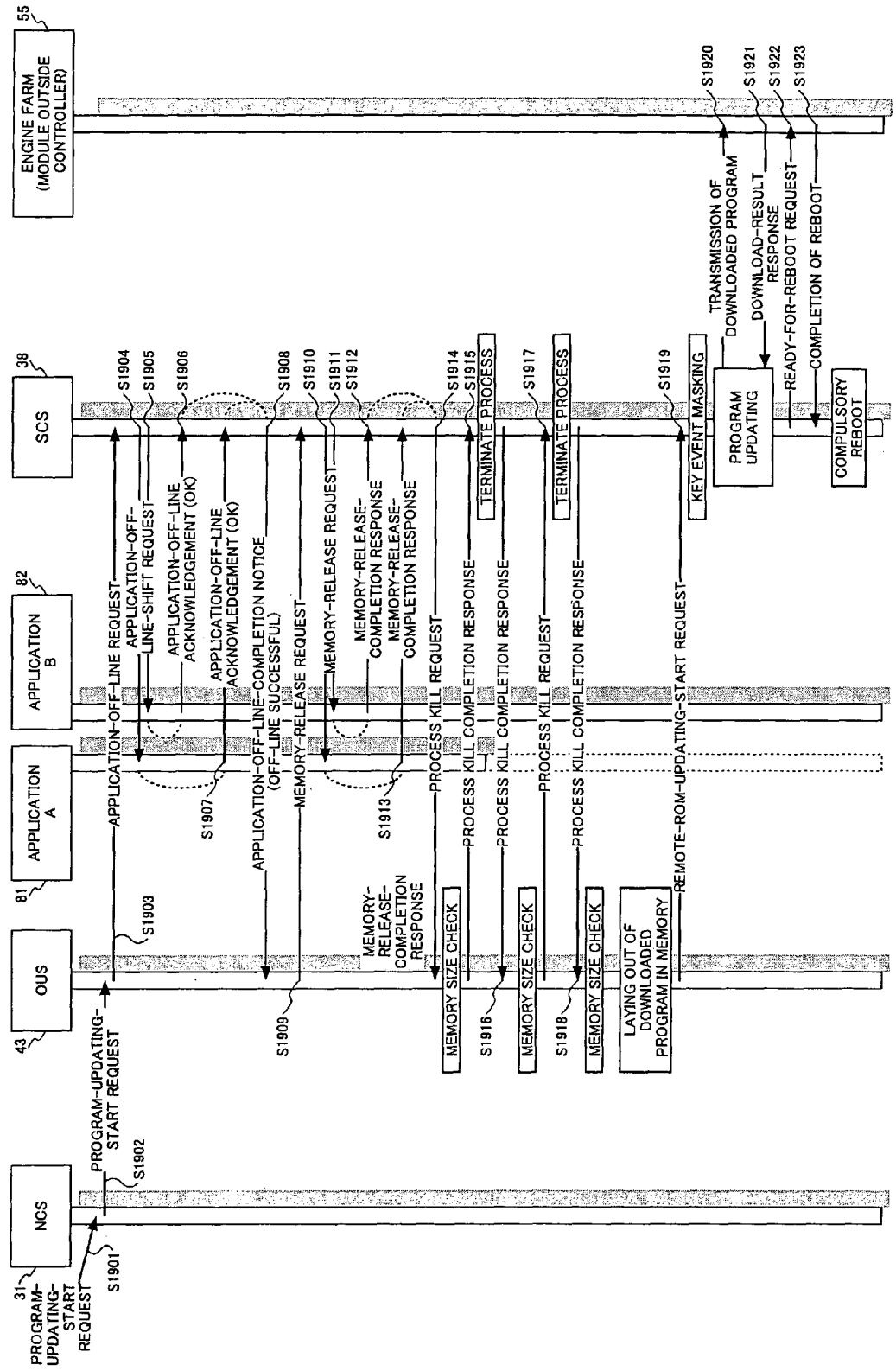
FIG. 36 is a sequence chart showing the processing that terminates an application according to the size of an updating program to be downloaded.

FIG. 36 is a a sequence chart showing the processing that terminates an application according to the size of an updating program to be downloaded.

At step S1901, the NCS 31 receives a program-updating-start notice from the network. At step S1902, the NCS 31 sends the program-updating-start notice to the OUS 43. Having received the program-updating-start notice, the OUS 43 sends an application-off-line request to the SCS 38 at step S1903.

Having received the application-off-line request from the OUS, the SCS 38 sends an application-off-line-shift request to the application A 81 and the application B 82 at step S1904 and step S1905, respectively.

In response to the application-off-line-shift request, the application A 81 and the application B 82 send an application-off-line acknowledgement (OK) to the SCS 38 if a shift to the off-line state is possible. In the case of this sequence chart, the application A 81 and the application B 82 can shift to the off-line state. Thus, the application A 81 and the application B 82 transmit an application-off-line acknowledgement (OK) to the SCS 38 at step S1906 and step S1907, respectively.

Having received the application-off-line acknowledgements (OK), the SCS 38 sends an application-off-line-completion notice to the OUS 43 at step S1908 to indicate that the applications are put in the off-line state.

Having received the application-off-line-completion notice, the OUS 43 transmits a memory-release request to the SCS 38 at step S1909. This request is aimed at having a memory area released from an application upon which restrictions are placed. Here, the memory area that is required to be released is a varying area.

In response to the memory-release request, the SCS 38 transmits a memory-release request to the application A 81 and the application B 82 at step S1910 and step S1911, respectively. Having received the memory-release request, the application A 81 and the application B 82 release a memory area, and send a memory-release-completion notice to the SCS 38 at step S1912 and step S1913, respectively.

Having received the memory-release-completion notices, the SCS 38 transmits a memory-release-completion notice to the OUS 43 at step S1914 as an indication that the release of memory areas has been completed.

Having received the memory-release-completion notice, the OUS 43 makes a memory size check by checking an available memory space. At this point of time, a memory space is not yet available that is sufficient for laying out an updating program to be downloaded. The OUS 43 sends a process KILL request to the SCS 38 at step S1915 in order to terminate the application process.

The SCS 38 responds to the process KILL request by terminating the application B 82 first. At step S1916, the SCS 38 transmits a process KILL completion response to the OUS 43.

Then, the OUS 43 checks memory size again. Since a memory space is not yet available that is sufficient for laying out an updating program to be downloaded, the OUS 43 sends a process KILL request again to the SCS 38 at step S1917.

The SCS 38 responds to the second process KILL request by terminating the application A 81. At step S1918, the SCS 38 transmits a process KILL completion response to the OUS 43.

In response to the process KILL completion response, the OUS 43 checks memory size. Since the termination of the application A 81 has created a sufficient memory space for laying out of the updating program to be downloaded, the OUS 43 downloads and lays out the updating program.

The OUS 43 sends a remote-ROM-updating-start request to the SCS 38 at step S1919. In response to the remote-ROM-updating-start request, the SCS 38 masks key events.

Thereafter, the SCS 38 transmits the downloaded updating program to the engine farm 55 at step S1920 in order to update a program. The engine farm 55 updates a program and notifies the SCS 38 of the updating results at step S1921.

When the results of updating a program are reported, the SCS 38 sends a ready-for-reboot request to the engine farm 55 at step S1922. At step S1923, the SCS 38 carries out a compulsory reboot to terminate the program updating in response to a notice from the engine farm 55 indicating the completion of reboot preparation.

In this manner, the SCS 38 releases memory areas allocated to processes according to the size of an updating program to be downloaded.

In what follows, a flowchart will be used to describe the detail of the above-described processing performed by the OUS 43 and the SCS 38.

Figure 37:
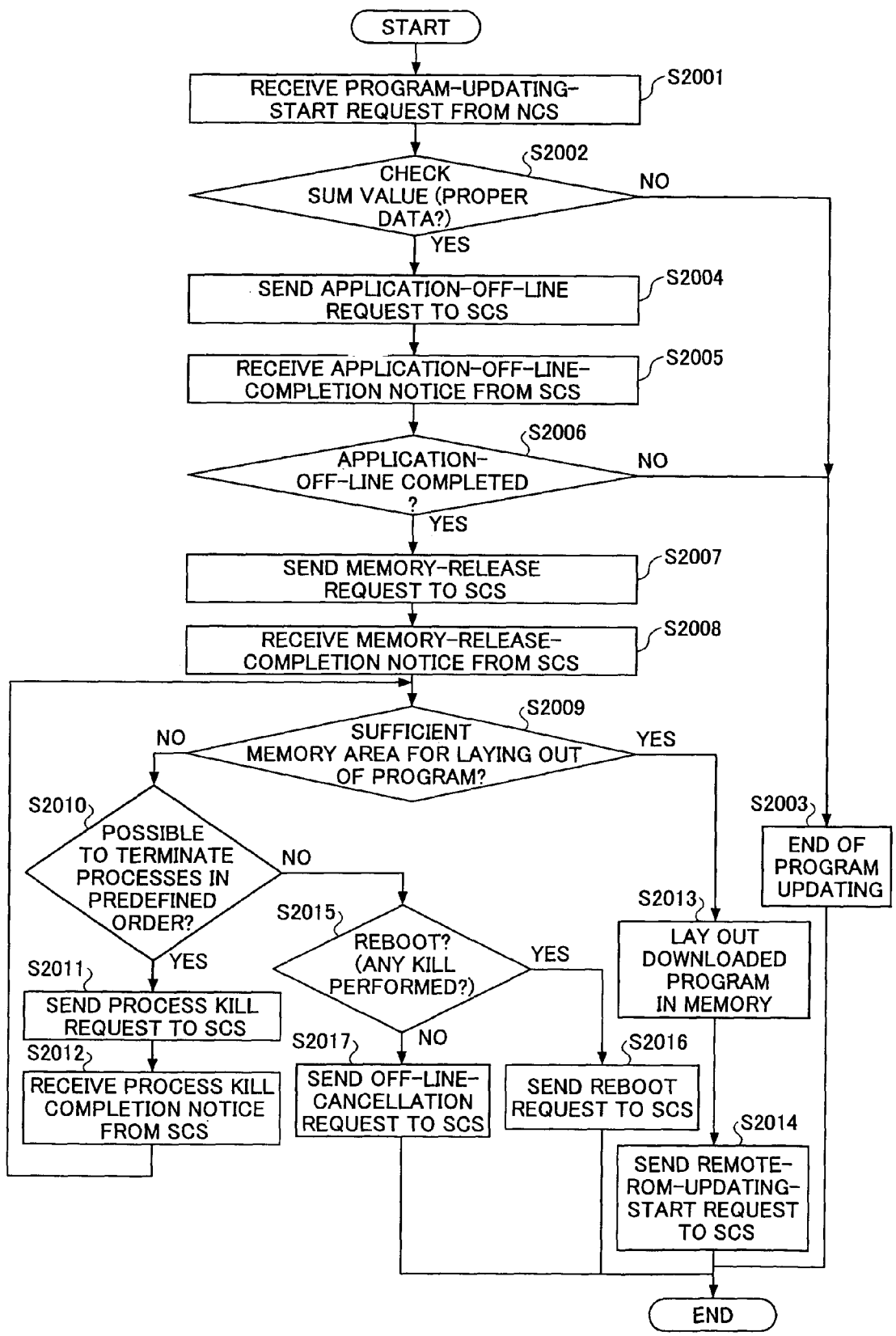
FIG. 37 is a flowchart showing a process performed by the OUS.

FIG. 37 is a flowchart showing a process performed by the OUS 43. At step S2001, the OUS 43 receives a notice indicative of the start of program updating from the NCS 31. At step S2002, the OUS 43 checks a SUM value in order to determine whether the received notice indicative of the start of program updating is proper data. If the notice indicative of the start of program updating is not proper data, the program updating comes to an end at step S2003.

If step S2002 finds that the notice indicative of the start of program updating is proper data, the OUS 43 sends an application-off-line request to the SCS 38 at step S2004. Receiving an application-off-line-completion notice at step S2005 as a response to the application-off-line request, the OUS 43 checks at S2006 whether the application off-line processing is completed.

If the OUS 43 finds at step S2006 that the application-off-line processing is not completed, the OUS 43 terminates program updating at step S2003.

If step S2006 finds that the application-off-line processing is completed, the OUS 43 sends a memory-release request to the SCS 38 at step S2007. Receiving a memory-release-completion notice from the SCS 38 at step S2008, the OUS 43 checks at step S2009 whether a memory area required for the laying out of an updating program has been secured.

If the OUS 43 finds that a memory area was not secured, the OUS 43 decides at step S2010 whether it is possible to terminate processes in a predetermined order.

The predetermined order is an order that has been decided in advance. As shown in FIG. 38, the predetermined order may be a default order that has been determined according to the priority of processes in the multifunction peripheral 1, a descending order of memory size that is the size of memory areas allocated to respective processes, or an order reflecting the position of a start address of memory areas allocated to the respective processes in the shared memory (see FIG. 4).

With the provision of predefined order in which the memory areas of processes are released by the SCS 38, it is possible to continue the execution of a high-priority application during the process of program updating. Such a high-priority application may be defined in the default order as a frequently used application, and a memory area allocated to such an application will not be released until the very end.

The order in which memory areas are released by the SCS 38 may be such that the applications are terminated first, then followed by terminating the modules of the control service layer 9 that are often shared by the applications.

If it is possible to terminate the processes in any one of the orders described above, the OUS 43 sends a process KILL request to the SCS 38 at step S2011. Receiving the process KILL completion notice from the SCS 38 at step S2012, the OUS 43 makes a check at step S2009 again.

If the OUS 43 ascertains, having returned to the processing of step S2010, that it is not possible to terminate processes in the predetermined order, the OUS 43 determines at step S2015 whether to reboot. This check at step S2015 determines whether to reboot by taking into consideration whether any application has ever been terminated.

If the OUS 43 has never terminated an application, the OUS 43 sends an application-off-line-cancellation request to the SCS 38 at step S2017. With this, the procedure comes to an end. Thereby, the applications return to the state in which formerly restricted processing is now allowed to run.

If the OUS 43 has terminated an application even once, the OUS 43 sends a reboot request to the SCS 38 at step S2016. Then, the procedure comes to an end.

If it is found at step S2009 that the OUS 43 has successfully secured a memory area required for the laying out of an updating program, the OUS 43 lays out the updating program in the memory area at step S2013. At step S2014, the OUS 43 sends a remote-ROM-updating-start request to the SCS 38. The procedure then comes to an end.

Figure 39:
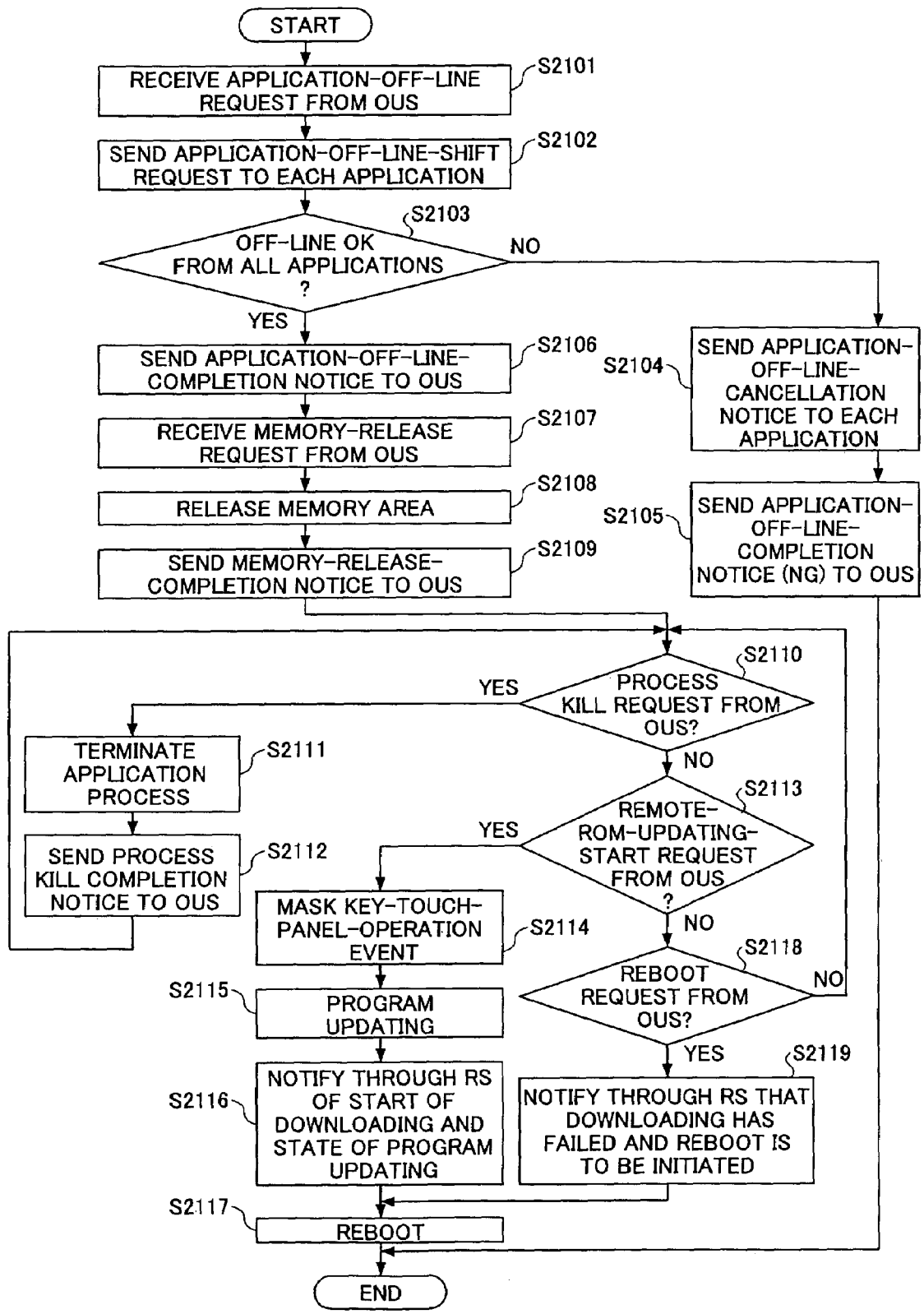
FIG. 39 is a flowchart of a process performed by the SCS.

FIG. 39 is a flowchart of a process performed by the SCS 38. At step S2101, the SCS 38 receives an application-off-line request from the OUS 43. In response to the application-off-line request, the SCS 38 transmits an application-off-line-shift request to each application at step S2102.

At step S2103, the SCS 38 checks whether an application-off-line acknowledgement (OK) is received from all the applications. If it is not the case, the SCS 38 sends an application-off-line-cancellation notice to each application at step S2104. At step S2105, the SCS 38 notifies the OUS 43 that the applications did not shift to the off-line state. Then, the procedure comes to an end.

If it is found at step S2103 that all the applications send an application-off-line acknowledgement (OK), the SCS 38 sends an application-off-line-completion notice to the OUS 43 at step S2106.

Receiving a memory-release request from the OUS 43 at step S2107, the SCS 38 lets the applications release memory areas at step S2108, and transmits a memory-release-completion notice to the OUS 43 at step S2109.

After transmitting the memory-release-completion notice to the OUS 43, processing by the SCS 38 branches according to requests from the OUS 43. If the SCS 38 receives a process KILL request from the OUS 43, the SCS 38 moves from step S2110 to step S2111 to terminate applications. The SCS 38 then sends a process KILL completion notice to the OUS 43 at step S2112, and performs step S2110 again.

If the SCS 38 does not receive a process KILL request at step S2110, the SCS 38 checks at step S2113 whether a remote-ROM-updating-start request is received from the OUS 43.

If the SCS 38 receives the remote-ROM-updating-start request at step S2113, the SCS 38 masks events concerning key-touch-panel operations at step S2114, thereby masking key events. At step S2115, the SCS 38 updates a program. At step S2116, the SCS 38 notifies a service center or the like of the start of downloading and the state of program updating through the RS 42 (see FIG. 1) and the network. The SCS 38 then reboots at step S2117. The procedure comes to an end.

The service center may be a server for maintenance and checking of the multifunction peripheral 1 at the manufacturer site, or may be a server provided at the site which distributes the updating program. Moreover, information indicative of the state of each application and module may be transmitted to the service center. The service center may record a log.

If the SCS 38 does not receive a remote-ROM-updating-start request at step S2113, the SCS 38 checks at step S2118 whether a reboot request is received from the OUS 43.

If a reboot request is not received from the OUS 43, the SCS 38 performs the process of step S2110 again. If a reboot request is received from the OUS 43, at step S2119, the SCS 38 notifies the service center or the like through the RS 42 and the network that downloading has failed and a reboot is to be initiated. With this, the procedure comes to an end.

Further, the present invention is not limited to these embodiments, but various variations and modifications may be made without departing from the scope of the present invention.

The present application is based on Japanese priority applications No. 2002-247448 filed on Aug. 27, 2002, No. 2002-249629 filed on Aug. 28, 2002, No. 2002-256761 filed on Sep. 2, 2002, and No. 2003-291045 filed on Aug. 11, 2003, with the Japanese Patent Office, the entire contents of which are hereby incorporated by reference.

What is claimed is:

1. An image-forming apparatus, in which hardware resources for use in the forming of images are provided, and in which one or more processes are run based on programs having instructions for the forming of the images, said apparatus comprising:

an off-line unit configured to put, in response to a notice indicating updating of one of the programs, said one or more processes in an off-line state, in which restriction is placed on the running of said one or more processes;

a memory area releasing unit configured to release one or more memory areas used by said one or more processes that are put in the off-line state; and a data laying-out unit configured to lay out data in said one or more memory areas released by said memory area releasing unit, wherein the data laid out by said data laying-out unit is an updating program for updating at least one of the programs, and said data laying-out unit obtains the updating program through data communication.

2. The apparatus as claimed in claim 1, wherein said data laying-out unit is configured to prompt said off-line unit to put said one or more processes in the off-line state as preparation for laying out the data in said one or more memory areas.

3. The apparatus as claimed in claim 2, wherein said data laying-out unit is configured to prompt said memory area releasing unit to release said one or more memory areas used by said one or more processes that are put in the off-line state, after said off-line unit puts said one or more processes in the off-line state.

4. The apparatus as claimed in claim 1, wherein said off-line unit is configured to send an off-line-shift request to said one or more processes for putting said one or more processes to the off-line state.

5. The apparatus as claimed in claim 4, wherein said off-line unit notifies said data laying-out unit whether said one or more processes are in the off-line state, upon receiving a response from said one or more processes responding to the off-line-shift request.

6. The apparatus as claimed in claim 5, wherein said off-line unit notifies said data laying-out unit that said one or more processes are in the off-line state, after all said one or more processes having received the off-line-shift request shift to the off-line state.

7. The apparatus as claimed in claim 5, wherein said off-line unit notifies said data laying-out unit that said one or more processes did not shift to the off-line state, after a notice indicating inability to shift to the off-line state is received from said one or more processes having received the off-line-shift request.

8. The apparatus as claimed in claim 5, wherein said off-line unit notifies said data laying-out unit that said one or more processes did not shift to the off-line state, after waiting for a response from all of said processes having received the off-line-shift request, even when a notice indicating inability to shift to the off-line state is received from one or more of said processes having received the off-line-shift request.

9. The apparatus as claimed in claim 5, wherein said off-line unit notifies said data laying-out unit that said one or more processes did not shift to the off-line state, after a notice indicating inability to shift to the off-line state is received from one of said one or more processes having received the off-line-shift request, without waiting for a response from others of said one or more processes having received the off-line-shift request.

10. The apparatus as claimed in claim 4, wherein said off-line unit measures a time lapse from the sending of the off-line-shift request to said one or more processes, and notifies said data laying-out unit that said one or more processes are in the off-line state after a predetermined length of the time lapse even if no response to the off-line-shift request is received from said one or more processes.

11. The apparatus as claimed in claim 1, wherein said one or more processes are allowed to run without said restriction after said off-line unit cancels the off-line state.

12. The apparatus as claimed in claim 1, wherein said restriction involves preventing an action by said one or more processes responding to a request from another process.

13. The apparatus as claimed in claim 12, wherein said one or more processes having shifted to the off-line state registers the request from another process.

14. The apparatus as claimed in claim 1, further comprising:
a process terminating unit configured to terminate said one or more processes having shifted to the off-line state.

15. The apparatus as claimed in claim 14, wherein said process terminating unit terminates said one or more processes in a predetermined order.

16. The apparatus as claimed in claim 15, wherein said order is defined according to priority assigned to each of said one or more processes.

17. The apparatus as claimed in claim 15, wherein said order is defined according to size of memory areas allocated to the one or more respective processes.

18. The apparatus as claimed in claim 15, wherein said order is defined according to position of memory areas allocated to the one or more respective processes.

19. The apparatus as claimed in claim 14, wherein said memory area releasing unit releases memory areas that are no longer used after said process terminating unit terminates said one or more processes.

20. The apparatus as claimed in claim 19, wherein said memory area releasing unit releases the memory areas according to size of said data that is to be laid out.

21. The apparatus as claimed in claim 1, wherein said memory area releasing unit is configured to notify said data laying-out unit of completion of releasing of the one or more memory areas after releasing the one or more memory areas.

22. The apparatus as claimed in claim 1, further comprising a program updating unit which updates at least one of the programs in response to a program updating start request sent from said data laying-out unit.

23. The apparatus as claimed in claim 22, further comprising an input unit which is used to operate said apparatus, and said program updating unit invalidates said input unit when updating at least one of the programs.

24. The apparatus as claimed in claim 22, wherein said program updating unit reboots said apparatus after completing the updating of at least one of the programs.

25. The apparatus as claimed in claim 22, wherein said program updating unit notifies a device of status of the program updating, said device communicating with said apparatus.

26. The apparatus as claimed in claim 25, wherein said program updating unit notifies of the status of the program updating by use of a process that has shifted to the off-line state.

27. The apparatus as claimed in claim 1, wherein said one or more memory areas are outside control of an operating system that controls the running of said one or more programs and the hardware resources.

28. The apparatus as claimed in claim 1, wherein the memory area releasing unit comprises:
a first unit configured to release one or more memory areas used by said one or more processes that are put in the off-line state; and
a second unit configured to release, in addition to the one or more memory areas used by said one or more processes, one or more memory areas for storing information that is necessary regardless of whether the one or more processes are executed.

29. A method of acquiring one or more memory areas in an image forming apparatus, in which hardware resources for use in forming images are provided, and one or more processes run based on programs having instructions for the forming of the images, the running of the programs and the hardware resources being controlled by an operating system, said method comprising:
an off-line step of putting, in response to a notice indicating updating of one of the programs, said one or more processes in a off-line state, in which restriction is placed on the running of said one or more processes;
a memory area releasing step of releasing one or more memory areas used by said one or more processes that are put in the off-line state; and
a data laying-out step of laying out data in said one or more memory areas released by said memory area releasing step,
wherein the data laid out in said data laying-out step in an updating program for updating at least one of the programs, wherein the updating program is obtaining through data communication.

30. The method as claimed in claim 29, further comprising a process terminating step of terminating said one or more processes having shifted to the off-line state.

* * * * *